(12) United States Patent
Larcheveque et al.

(10) Patent No.: US 9,275,042 B2
(45) Date of Patent: Mar. 1, 2016

(54) SEMANTIC CLUSTERING AND USER INTERFACES

(71) Applicant: VirtuOz SA, Paris (FR)

(72) Inventors: Jean-Marie Henri Daniel Larcheveque, Paris (FR); Elizabeth Ireland Powers, Paris (FR); Freya Kate Recksiek, Paris (FR); Dan Teodosiu, Boulogne-Billancourt (FR)

(73) Assignee: VirtuOz SA, Paris (FR)

( * ) Notice: Subject to any disclaimer, the term of this patent is extended or adjusted under 35 U.S.C. 154(b) by 146 days.

(21) Appl. No.: 14/163,744

(22) Filed: Jan. 24, 2014

(65) Prior Publication Data
US 2014/0207441 A1 Jul. 24, 2014

Related U.S. Application Data

(63) Continuation of application No. 12/748,150, filed on Mar. 26, 2010, now Pat. No. 8,694,304.

(51) Int. Cl.
*G06F 17/27* (2006.01)
*G06F 17/20* (2006.01)
(Continued)

(52) U.S. Cl.
CPC ........ *G06F 17/2785* (2013.01); *G06F 17/3071* (2013.01); *G06F 17/30654* (2013.01)

(58) Field of Classification Search
CPC ....................................................... G06F 17/02
USPC ........................................... 704/1, 9, 10, 257
See application file for complete search history.

(56) References Cited

U.S. PATENT DOCUMENTS

| 4,994,983 A | 2/1991 | Landell et al. |
| 5,519,608 A | 5/1996 | Kupiec |
| 5,528,491 A | 6/1996 | Kuno et al. |

(Continued)

FOREIGN PATENT DOCUMENTS

| WO | WO 96/13830 | 5/1996 |
| WO | WO 2011/119171 | 9/2011 |
| WO | WO 2012/047214 | 4/2012 |

OTHER PUBLICATIONS

Lee et al. "Automatic Agenda Graph Construction from Human-Human Dialogs using Clustering Method". Proceedings of Human Language Technologies: The 2009 Annual Conference of the North American Chapter of the Association for Computational Linguistics, May 31-Jun. 5, 2009, Boulder, Colorado.*

(Continued)

*Primary Examiner* — Jesse Pullias
(74) *Attorney, Agent, or Firm* — Hamilton, Brook, Smith & Reynolds, P.C.

(57) ABSTRACT

Semantic clustering techniques are described. In various implementations, a conversational agent is configured to perform semantic clustering of a corpus of user utterances. Semantic clustering may be used to provide a variety of functionality, such as to group a corpus of utterances into semantic clusters in which each cluster pertains to a similar topic. These clusters may then be leveraged to identify topics and assess their relative importance, as for example to prioritize topics whose handling by the conversation agent should be improved. A variety of utterances may be processed using these techniques, such as spoken words, textual descriptions entered via live chat, instant messaging, a website interface, email, SMS, a social network, a blogging or micro-blogging interface, and so on.

20 Claims, 10 Drawing Sheets

(51) Int. Cl.
    *G06F 17/21* (2006.01)
    *G06F 17/30* (2006.01)

(56) References Cited

U.S. PATENT DOCUMENTS

| | | | |
|---|---|---|---|
| 5,680,511 A | 10/1997 | Baker et al. |
| 5,696,962 A | 12/1997 | Kupiec |
| 5,799,268 A | 8/1998 | Boguraev |
| 5,828,999 A | 10/1998 | Bellegarda et al. |
| 5,873,056 A | 2/1999 | Liddy et al. |
| 5,966,686 A | 10/1999 | Heidorn et al. |
| 5,995,922 A | 11/1999 | Penteroudakis et al. |
| 6,081,774 A | 6/2000 | de Hita et al. |
| 6,243,669 B1 | 6/2001 | Horiguchi et al. |
| 6,246,977 B1 | 6/2001 | Messerly et al. |
| 6,256,629 B1 | 7/2001 | Sproat et al. |
| 6,356,864 B1 | 3/2002 | Foltz et al. |
| 6,411,924 B1 | 6/2002 | de Hita et al. |
| 6,415,257 B1 | 7/2002 | Junqua et al. |
| 6,442,524 B1 | 8/2002 | Ecker et al. |
| 6,470,306 B1 | 10/2002 | Pringle et al. |
| 6,745,161 B1 | 6/2004 | Arnold et al. |
| 6,760,695 B1 | 7/2004 | Kuno et al. |
| 6,910,003 B1 | 6/2005 | Arnold et al. |
| 6,993,475 B1 | 1/2006 | McConnell et al. |
| 7,401,087 B2 | 7/2008 | Copperman et al. |
| 7,406,456 B2 | 7/2008 | Calistri-Yeh et al. |
| 7,689,410 B2 | 3/2010 | Chang et al. |
| 7,877,371 B1 | 1/2011 | Lerner et al. |
| 7,882,055 B2 | 2/2011 | Estes |
| 7,912,720 B1 | 3/2011 | Hakkani-Tur et al. |
| 8,170,969 B2 | 5/2012 | Roettger et al. |
| 8,180,627 B2 | 5/2012 | Bogl et al. |
| 8,515,736 B1 | 8/2013 | Duta |
| 8,676,565 B2 | 3/2014 | Larcheveque et al. |
| 8,694,304 B2 | 4/2014 | Larcheveque et al. |
| 9,196,245 B2 | 11/2015 | Larcheveque et al. |
| 2002/0002454 A1 | 1/2002 | Bangalore et al. |
| 2002/0188448 A1 | 12/2002 | Goodman et al. |
| 2003/0130837 A1 | 7/2003 | Batchilo et al. |
| 2003/0130976 A1 | 7/2003 | Au |
| 2003/0171915 A1 | 9/2003 | Barklund et al. |
| 2003/0176999 A1 | 9/2003 | Calcagno et al. |
| 2003/0182631 A1 | 9/2003 | Tsochantaridis et al. |
| 2004/0054521 A1 | 3/2004 | Liu |
| 2004/0117449 A1 | 6/2004 | Newman et al. |
| 2004/0162806 A1 | 8/2004 | Liu |
| 2005/0091030 A1 | 4/2005 | Jessee et al. |
| 2005/0105712 A1 | 5/2005 | Williams et al. |
| 2005/0125217 A1 | 6/2005 | Mazor |
| 2005/0251382 A1 | 11/2005 | Chang et al. |
| 2005/0251383 A1 | 11/2005 | Murray |
| 2005/0278613 A1 | 12/2005 | Morinaga et al. |
| 2006/0053043 A1 | 3/2006 | Clarke |
| 2006/0129397 A1 | 6/2006 | Li et al. |
| 2006/0136375 A1 | 6/2006 | Cox et al. |
| 2006/0136403 A1 | 6/2006 | Koo |
| 2006/0217962 A1 | 9/2006 | Asano |
| 2006/0253431 A1 | 11/2006 | Bobick et al. |
| 2006/0253476 A1 | 11/2006 | Roth et al. |
| 2006/0293880 A1 | 12/2006 | Elshishiny et al. |
| 2007/0067157 A1 | 3/2007 | Kaku et al. |
| 2008/0195391 A1 | 8/2008 | Marple et al. |
| 2008/0275694 A1 | 11/2008 | Varone |
| 2008/0319738 A1 | 12/2008 | Liu et al. |
| 2009/0089046 A1 | 4/2009 | Uchimoto et al. |
| 2009/0160658 A1 | 6/2009 | Armstrong et al. |
| 2009/0306981 A1 | 12/2009 | Cromack et al. |
| 2010/0004923 A1 | 1/2010 | Bogl et al. |
| 2010/0005061 A1 | 1/2010 | Basco et al. |
| 2010/0023482 A1 | 1/2010 | Mershon et al. |
| 2010/0161327 A1 | 6/2010 | Chandra et al. |
| 2011/0238408 A1 | 9/2011 | Larcheveque |
| 2011/0238409 A1 | 9/2011 | Larcheveque |
| 2011/0238410 A1 | 9/2011 | Larcheveque et al. |
| 2011/0301941 A1 | 12/2011 | De Vocht |
| 2012/0089394 A1 | 4/2012 | Teodosiu |
| 2012/0233188 A1 | 9/2012 | Majumdar |
| 2012/0259856 A1 | 10/2012 | Gehrking et al. |
| 2014/0200891 A1 | 7/2014 | Larcheveque et al. |

OTHER PUBLICATIONS

International Search Report and Written Opinion issued in International Application No. PCT/US2010/028898, Entitled Semantic Clustering, dated Mar. 25, 2011 (9 pages).
International Search Report and Written Opinion issued in International Application No. PCT/US2010/051616, Entitled Visual Display of Semantic Information, dated Jul. 5, 2012 (7 pages).
Corrected International Search Report and Written Opinion issued in International Application No. PCT/US2010/051616, Entitled Visual Display of Semantic Information, dated Jul. 30, 2012 (7 pages).
Budanitsky, A., et al., "Evaluating Wordnet-Based Measures of Lexical Semantic Relatedness," *Computational Linguistics*, 32.1:13-47 (2006).
Office Action dated Mar. 1, 2013 issued in U.S. Appl. No. 12/748,091, Entitled Semantic Clustering.
Notice of Allowance dated Nov. 22, 2013 for U.S. Appl. No. 12/748,150, Entitled Semantic Clustering and User Interfaces.
Office Action dated Jun. 9, 2015 for U.S. Appl. No. 12/748,091.
International Preliminary Report on Patentability, International Application No. PCT/US2010/028898, "Semantic Clustering," Date Issued: Oct. 2, 2012, 6 pages.
Final Office Action dated Jul. 31, 2013 for U.S. Appl. No. 12/748,091.
Final Office Action dated Jan. 8, 2015 for U.S. Appl. No. 12/748,091.
Notice of Allowance dated Jul. 23, 2013 for U.S. Appl. No. 12/748,150.
Office Action dated Apr. 8, 2013 for U.S. Appl. No. 12/748,150.
Office Action dated Jun. 6, 2014 for U.S. Appl. No. 12/748,091.
Supplemental Notice of Allowance dated Dec. 16, 2013 for U.S. Appl. No. 12/748,150.
Notice of Allowance issued in U.S. Appl. No. 12/748,091 dated Dec. 14, 2015, entitled "Semantic Clustering,".

* cited by examiner

300

ID

SEMANTIC CLUSTERING AND USER INTERFACES

RELATED APPLICATION(S)

This application is a continuation of U.S. application Ser. No. 12/748,150, filed Mar. 26, 2010 now U.S. Pat. No. 8,694,304, issued Apr. 8, 2014. The entire teachings of the above patent are incorporated herein by reference.

BACKGROUND

Companies continue to develop an ever increasing variety of techniques to interact with customers. For example, a company may provide a website that includes details about products and/or services of the company. Additionally, the website may include support information, or functionality to purchase products and services from the company. A customer, for instance, may interact with the website to find information about a prospective purchase and later, after the purchase, to find information regarding use of the purchase. Consequently, the amount of information that is made available via these techniques is ever-increasing, which may make it difficult for customers to locate desired information using traditional techniques.

One such traditional technique that has been employed by the companies involves the use of search technologies. For example, the company may include search technologies on a website to allow customers to hunt for answers to their questions. This may work well for certain types of queries and issues, but may fail as questions become increasingly complex, as issue resolution may require personalized information, and so on. As a result, users may "walk away" from the website frustrated, may make a time-consuming call to a human customer service representative (CSR), and so on. Therefore, traditional search techniques may have a negative impact on user experience with the website and consequently on the user's view of the company as a whole.

SUMMARY

Semantic clustering techniques are described. In various implementations, a conversational agent is configured to accept natural language input from a user ("utterances") and then perform deep linguistic analysis of these utterances. Semantic clustering may be applied to the output of such analysis to provide a variety of functionalities, such as grouping a corpus of utterances into semantic clusters in which each cluster pertains to a similar topic. These semantic clusters may then be leveraged to identify topics and assess their relative importance in order to, for example, prioritize topics that occur frequently or topics whose handling by the conversational agent should be improved. A variety of utterances may be processed using these techniques, such as spoken words or textual descriptions entered via instant messaging, a website interface, SMS, email, a social networking, blogging or micro-blogging service, and so on.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
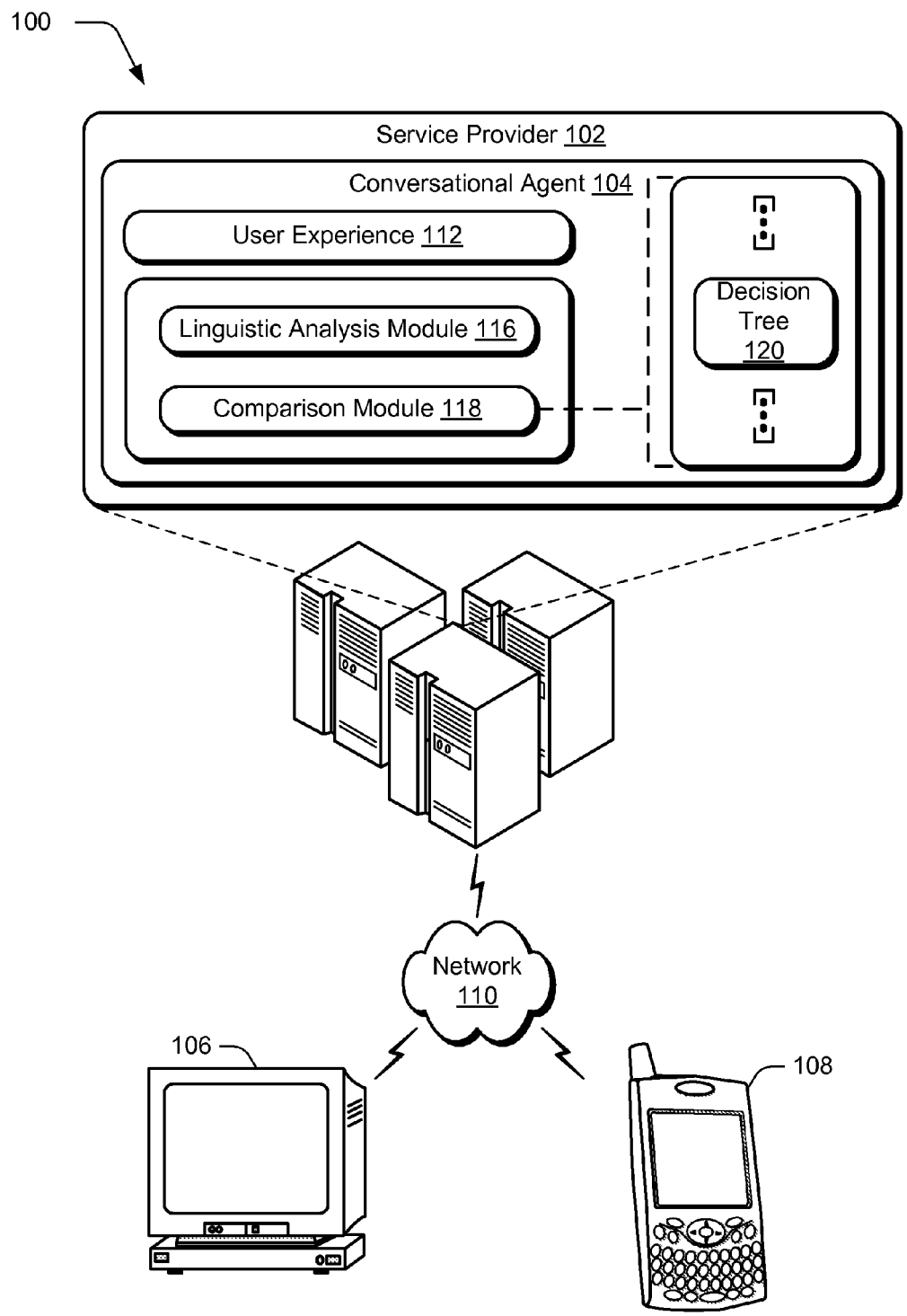
FIG. 1 is an illustration of an environment in an example implementation that is operable to perform semantic clustering techniques for a conversational agent.

Users may have access to an ever-increasing variety of information from an ever-increasing variety of sources, such as via a website, mobile communications device, email, instant messaging, and so on. Consequently, it has become increasingly difficult for a user to locate desired information from within this variety of information, which may lead to user frustration with the traditional techniques used to access the information as well as the provider of the information, e.g., the company itself.

Conversational agent techniques are described, which include semantic clustering and other functionalities that are described in the following sections. In various implementations, conversational agents are implemented using one or more modules to engage in an interactive natural language dialog with a user via a textual chat. Thus, use of conversational agents may provide automated assistance to users to help them resolve issues without directly interacting with a human agent (e.g., a customer support representative in a call center). This may help a company to efficiently utilize resources and provide additional functionality to a user that was not available via traditional search techniques. The textual chat may be inputted using a variety of mechanisms, such as transcripts of spoken words (such as telephone calls), text inputs (e.g., instant messages, live chat, email, SMS, blogging and micro-blogging services, and so on), automatic speech recognition, and so forth.

Through use of linguistic analysis techniques, the conversational agent may map user inputs (henceforth called "utterances") to semantic representations. Such representations may be graphs, the nodes of which represent concepts and the edges of which represent semantic roles. Such graphs will henceforth be called "semantic graphs".

The conversational agent may represent a user intent by an intent graph pattern or a plurality of intent graph patterns. Thus, a user utterance may be formed into a semantic graph and compared with intent graph patterns (henceforth called "graph patterns"). If there is a match then the utterance likely involves the intent represented by the graph pattern or plurality of graph patterns.

Semantic graphs representing utterances may be grouped into semantic clusters using various techniques referred to as semantic clustering techniques. Each of the semantic clusters may pertain to a similar topic. These semantic clusters can then be leveraged to determine dominant or active topics in a corpus of utterances for a variety of purposes. For example, semantic clusters may be used to improve the quality of a conversational agent. Further discussion of semantic clustering techniques and conversational agents may be found in relation to the following sections.

In the following discussion, an example environment is described along with example procedures that may be implemented in the example environment as well as in other environments. Accordingly, the example procedures are not limited to implementation in the example environments and the example environments are not limited to implementation of the example procedures.

Example Environment

FIG. 1 illustrates an example environment 100 that is operable to employ semantic clustering techniques for a conversational agent. The illustrated environment 100 includes a service provider 102 having a conversational agent 104 that is accessible to a plurality of client devices 106, 108 over a network 110. The client devices 106, 108 may be configured in a variety of ways. For example, the client devices may be configured as a computing device that is capable of communicating over the network, such as a desktop computer as illustrated by client device 106, a mobile station, an entertainment appliance, a set-top box communicatively coupled to a display device, a wireless phone as illustrated by client device 108, a game console, and so forth. Thus, the client devices may range from full resource devices with substantial memory and processor resources (e.g., personal computers, game consoles) to a low-resource device with limited memory and/or processing resources (e.g., traditional set-top boxes, hand-held game consoles).

Likewise, the network 110 may assume a variety of configurations. For example, the network 110 may include a wide area network (WAN), a local area network (LAN), a wireless network, a public telephone network, an intranet, a telephone network, and so on. Further, although a single network 110 is shown, the network 110 may be configured to include multiple networks. For instance, the client device 106 configured as a desktop computer and the service provider 102 may be communicatively coupled via the Internet and the client device 108 configured as a wireless phone may be communicatively coupled to the service provider 102 via a telephone network. A wide variety of other instances are also contemplated.

The service provider 102 is illustrated as being implemented by one or more servers (or other computing devices) that are accessible to the client devices 106, 108 via the network 110. Additionally, the conversational agent 104 is illustrated as a module that is implemented by the service provider 102. For example, the conversational agent 104 may include a user experience 112 that is accessible via a webpage output by the service provider 102 to the client device 106 configured as a desktop computer. In another example, the conversational agent 104 may include a user experience 112 that is accessible via a spoken input received by the client device 108 configured as a wireless phone. Thus, user experience of the conversational agent 104 may be accessed through a wide variety of techniques. A variety of other examples are also contemplated, such as instant messaging, email, user-generated content in conjunction with a social network, blogging and micro-blogging services, and so on.

Generally, any of the functions described herein can be implemented using software, firmware, hardware (e.g., fixed logic circuitry), manual processing, or a combination of these implementations. The terms "module" and "functionality" as used herein generally represent software, firmware, hardware, or a combination thereof. In the case of a software implementation, the module and/or functionality represents instructions (e.g., program code) that perform specified tasks when executed on a processing system that may include one or more processors or other hardware. The program code can be stored in a wide variety of types and combinations of memory may be employed, such as random access memory (RAM), hard disk memory, removable medium memory, and other types of computer-readable media. The features of the semantic clustering techniques described below are platform-independent, meaning that the techniques may be implemented on a variety of commercial computing platforms having a variety of processors.

The conversational agent 104 is configured to engage in an interactive natural language dialog with a human user via textual chat, to complete a specific task for or on behalf of that user. For example, text entered by a user through interaction with the client device 106 configured as a desktop computer may be provided to the conversational agent 104. In another example, a voice input provided by the client device 108 configured as a wireless phone may be converted to text and processed by the conversational agent 104; the response of the conversational agent 104 can then be converted back to speech before being sent to the client device 108.

Tasks may include providing information to the user, answering the user's questions, helping the user solve a problem (support agent), proposing new products and services to the user (sales and/or marketing agent), and so on.

The conversational agent 104 may embed complex logic flows to aid interaction with the user using natural language. The conversational agent 104 may also interact with various application programming interfaces (APIs) and backend systems of a company that offers use of the agent, e.g., the service provider 102. For example, the conversational agent 104 may be offered as a visual avatar on a company web site (or a specific section of the site), but other interaction channels such as instant messaging systems, mobile phones, email, social networking sites, or blogging and micro-blogging services are also contemplated. The conversational agent 104 may respond to user questions and also drive the conversation to solicit specific information to better understand the user's situation.

Example Conversation Strategy

Utterances that are received (e.g., spoken or typed by a user) are parsed by a linguistic analysis module 116 of the conversational agent 104 and may be matched by a comparison module 118 against a number of possible intents that are part of one or more decision trees 120. Based on the identified intent, the conversational agent 104 may then generate a reply. A conversation between the user and the agent may include one or more of these interactions between the user and the conversational agent 104.

A user's intent can be expressed in a variety of ways. For example, the user's intent may be configured as a single information request, may include a set of several potential information requests, and so on. In the latter case, the conversational agent 104 may ask for clarification until a specific information request is identifiable and may be satisfied.

In one or more implementations, conversations are modeled as paths through a set of decision trees 120, which may be configured as circuit-like structures that describe possible conversation flows. The root of each decision tree 120 may describe an initial state, before a user intent has been identified. Leaves of the decision tree 120 may be thought of as answers to a specific request. Accordingly, a path from the root to a leaf of the decision tree 120 may represent a sequence of utterances (e.g., speech acts) that may lead to identification of the information requested by the user and thus completion of the conversational agent's 104 task. In addition to a simple traversal of the decision tree 120, the conversational agent 120 may offer increasingly complex dialog strategies that allow the user to switch between tasks (or decision trees) flexibly.

The set of intents that can be matched to user utterances at a particular point in time relates to a current position of a conversation in the decision tree 120. For example, a customer of a telecommunications company might initiate a conversation by asking, "Can I access my voice mail from the web?" Upon recognizing the intent of the question, the conversational agent 104 moves from the decision tree's 120 root node to one of the root's child nodes. Assuming that the company delivers phone services through a cellular network, landlines, and VoIP, the conversational agent 104 may consult the information that is relevant to proceed in the decision tree 120 and respond with a clarifying question, e.g., "What type of phone service do you use for your voice mail?"

Assuming the user answers with an utterance that includes sufficient information and is recognized by the agent, the conversational agent 104 has identified the user's intent and moves to a leaf node, which contains an answer to the user's question. It should be noted that a user utterance such as "VoIP" may be associated with a different intent when produced at the beginning of the conversation, at the root of the decision tree 120, as opposed to later in the conversation at the node corresponding to web access to voicemail.

In addition to the current position in the decision tree 120, the conversational agent 104 may have knowledge of pieces of information that were obtained earlier during the conversation. For example, this additional information may be represented as variable-value pairs, which may act to limit the user from asking a same question multiple times, asking for information that was already provided by user, and so on. Additionally, the conversational agent 104 may implement complex and sophisticated conversation strategies. For example, the conversational agent 104 may proactively ask questions and volunteer related pieces of information based on information known about the user from the conversation or other data collected about the user (e.g., via an API provided by the service provider 102 offering the conversational agent 104).

Matching User Utterances to User Intents

Figure 2:
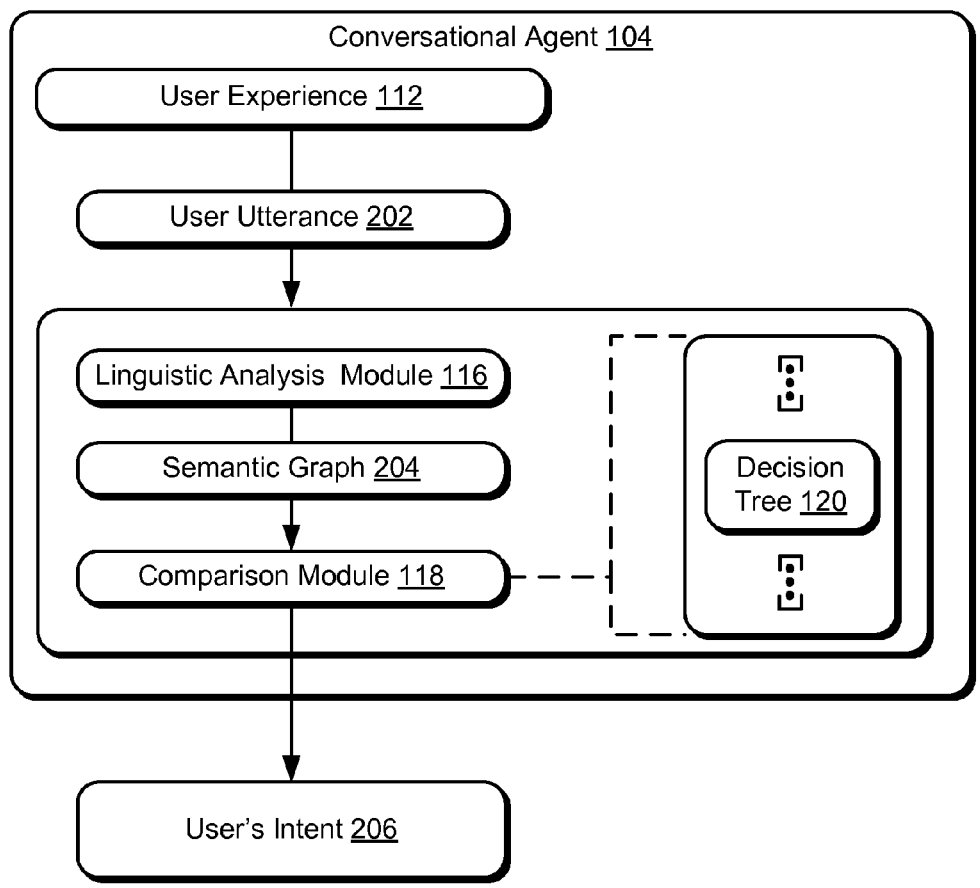
FIG. 2 illustrates an example implementation of a procedure to match a user utterance to likely user intents.

FIG. 2 illustrates an example implementation 200 of a procedure to match a user utterance to a likely intent. User utterance 202 is illustrated as being provided to the linguistic analysis module 116 via the user experience 112. Upon receipt of the user utterance 202, the linguistic analysis module 116 may form a semantic graph 204. The semantic graph 204 may then be leveraged by the comparison module 118 to determine a closest matching pattern through a decision tree 120 lookup, and from that, a user's intent 206. By using these techniques, the conversational agent 104 is configured to deal with "messy" and "real" user utterances 202. For example, the user utterance may contain a high percentage (over 50%) of misspelled, ungrammatical or incomplete sentences, abbreviations, slang, and so on.

Parsing and Semantic Representations of Input Sentences

Figure 3:
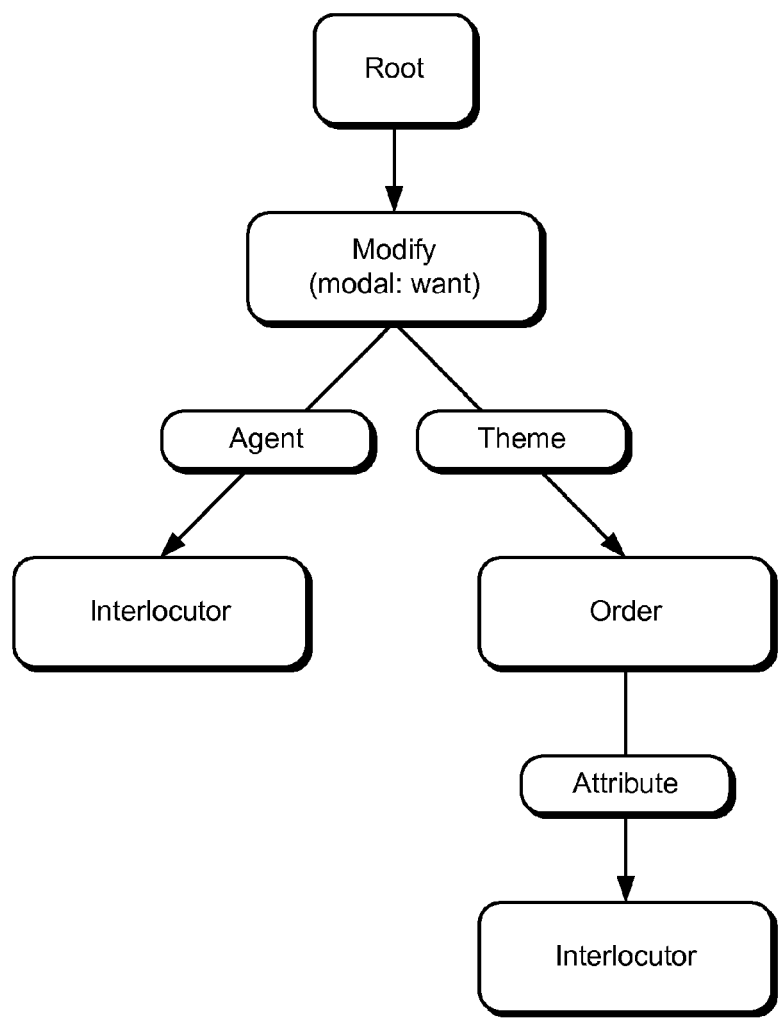
FIG. 3 is an illustration of an example semantic graph that is generated by a conversational agent of FIG. 1 for a user utterance.

FIG. 3 is an illustration of an example semantic graph 300 that is generated by the conversational agent 104 of FIG. 1 for a user utterance. Text from a user's utterance (e.g., spoken, written, and so on) may be parsed into a semantic graph 300. The nodes of the semantic graph 300 represent concepts; the directed edges are labeled with semantic functions in the figure. Together, concepts related to nodes and semantic functions related to edges will be called semantic concepts or traits (and may also be referred to as attributes, properties, features, and so on). For example, the sentence "I'd like to change my order" may be parsed into the semantic graph 300 shown in FIG. 3.

The main trait of a node is the concept it represents. In an implementation, concept traits (e.g., "modify" in FIG. 3) are abstracted over lexical variations and spelling mistakes. For example, replacing the word "change" by "alter," "modify," or even "moddify" (sic) in the user input does not affect the structure of the semantic graph 300 shown in FIG. 3. Likewise, representing "my" and "I" by the concept Interlocutor makes the interpretation of the semantic form insensitive to the form used in the user utterance. For example, the utterance "You would like to modify your order" may be parsed by the linguistic analysis module 116 to form the graph 300 shown in FIG. 3. Similarly, "We would like to change our order" may also be parsed by the linguistic analysis module 116 into the graph 300 shown in FIG. 3.

In implementations, constructions such as "would like to" are represented by a modal trait on the modify node and not a concept trait. Additionally, this particular value may be present on one or more of the utterances "I'd like to", "I want to", "I wanna", and so on. In this way, a single representation may be provided for a variety of synonymous constructions. On the other hand, use of a dedicated modal trait rather than creating a node with a "want-to" concept trait may help to simplify the semantic graphs and thus facilitate pattern matching, further discussion of which may be found later in the "Pattern Matching" section of the description.

The graph edges that are drawn in FIG. 3 may be referred to as "function edges" with the respective labels representing semantic roles. For example, in FIG. 3 Order is the theme of Modify, i.e., the object acted upon. In FIG. 3, this is denoted by the Theme label on the edges between the two nodes, denoting the "theme" semantic role. The Theme label may still fulfill this role even if the same relation were expressed in the passive, e.g., "Has my order been modified?" where "order" is a syntactic subject. Thus, semantic abstraction may be used to provide a straightforward identification of common ideas in different utterances, which may increase the efficiency and accuracy of a pattern matching process to be discussed later.

In the semantic graph 300, function edges and their incident nodes form a tree. In implementations, the root of the tree may be used as a placeholder that does not represent a particular concept of the utterance. For example, the concept trait may be set to a value "Top," which is representative of the most general concept.

It should be noted that parsing may focus on extracting dependencies between words, which may then be mapped to dependencies between concepts. This approach, known generically as a dependency grammar, does not make assumptions on phrase structure. Therefore, incomplete sentences and ungrammatical sentences may be handled and mapped to a semantic graph, much in the way a human may extract meaning from ungrammatical or incomplete sentences. This approach allows a conversational agent to be robust and able to understand "real" user utterances, which are often grammatically incorrect, may contain typos and spelling mistakes, and may use slang words or phrases.

Example Linguistic Analysis

Figure 4:
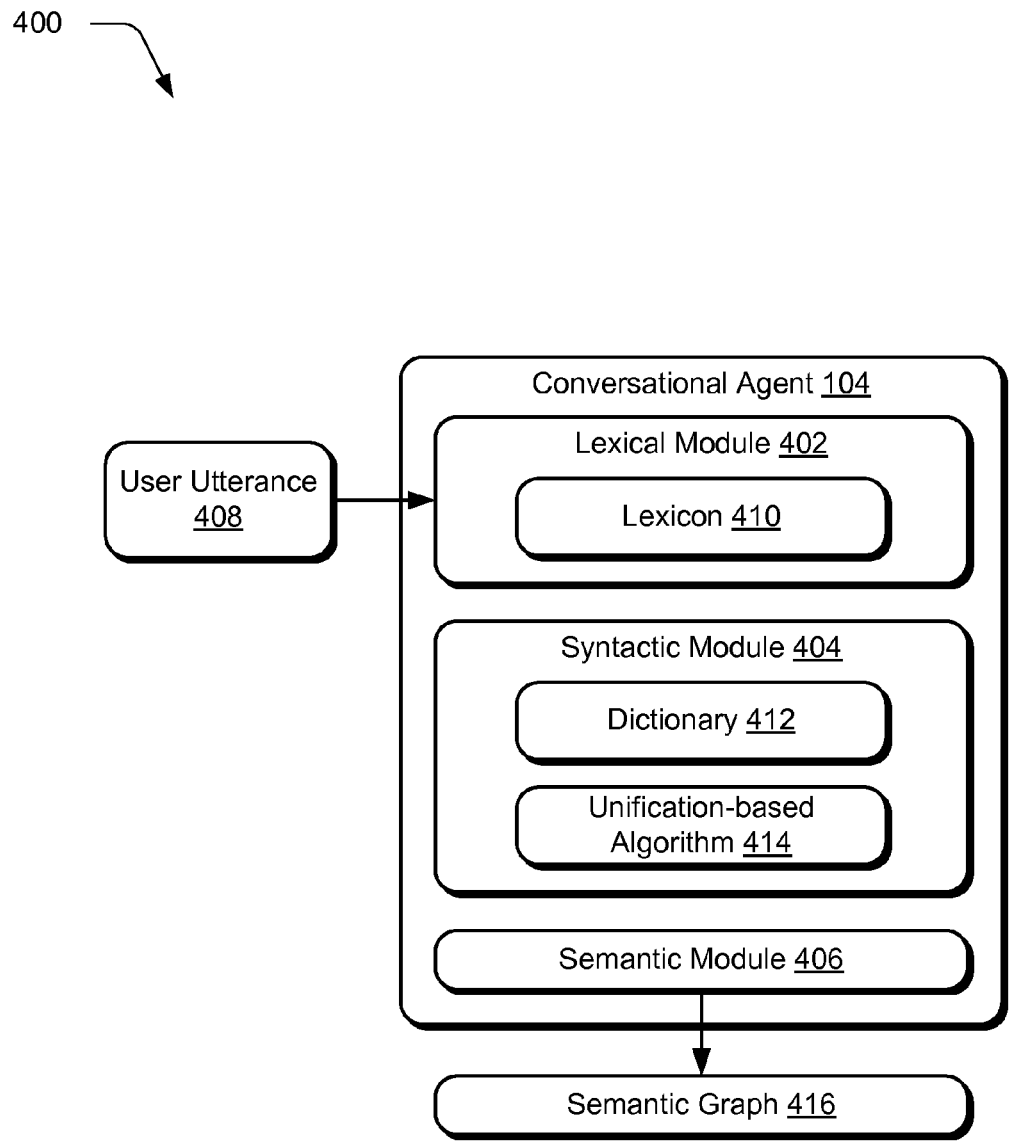
FIG. 4 depicts an example implementation of a system for performing linguistic analysis of a user utterance.

FIG. 4 depicts an example implementation of a system 400 for parsing (or analyzing) a user utterance. The system 400 of FIG. 4 illustrates a conversational agent 104 as being portioned into a lexical module 402, a syntactic module 404, and a semantic module 406 which are representative of functionality that may be employed at different levels in the parsing procedure. At the lexical module 402 level, a user utterance 408 (e.g., a sentence) is segmented into words and each word is matched against entries in a lexicon 410 with the aid of a spell checker.

Because there may be a variety of spelling suggestions for a word, and a lexical entry may include several words (for example "credit card" or "bill of sale"), the lexical module 402 of the conversational agent 104 may map a word sequence of the user utterance 408 to one or more flexion sequences. A flexion is a lexical entry that includes a lemma (i.e., an uninflected form) and possibly grammatical marks, such as tense, number, person, mood, and so on. For example, the lemma "agent" may have the flexions that include "agent" and "agents."

In an implementation, the lexicon 410 that is used to match words to flexions is language-dependent. Additionally, some of the entries contained therein may be specific to a business area, a conversational agent, and so on. For example, lexical entries may include names of forms specific to a business area or commercial names specific to the conversational agent 104. Accordingly, lexicon 410 lookup may be filtered by word spaces, where a word space characterizes a conversational agent or a business area.

At the syntactic module 404 level, information that is common to the flexions of a given lemma is stored in a dictionary 412. This information may include (1) construction information and (2) ontology information. Ontology information pertains to the semantic level; and provides the concept traits which are further mentioned in the "Parsing and semantic representations of input sentences" Section and FIG. 3. Construction information includes possible part-of-speech assignments to a lemma For example, "format" may be assigned both verb and noun constructions. Construction information may also include syntactic patterns linking the dictionary item to other items. For example, the construction for "format" as a verb may show that the item relates to a noun with a subject link and to another noun with an object link.

A unification-based algorithm 414 may be employed to unify available constructions of the lemmata (i.e., a plurality of lemma) in a sequence to yield one or more syntactic graphs. In addition to part-of-speech information, linearity information (e.g., in English, a tendency of objects to occur after verbs) and the confidence assigned to the recognition of particular constructions may be taken into account to score the graphs.

At the semantic module 406 level, a highest-scoring syntactic graph is mapped to a semantic graph 416. As a result of this process, a semantic graph 416 having increased abstraction is obtained in which nodes represent ontology concepts and edges represent logical relations between the concepts.

Figure 5:
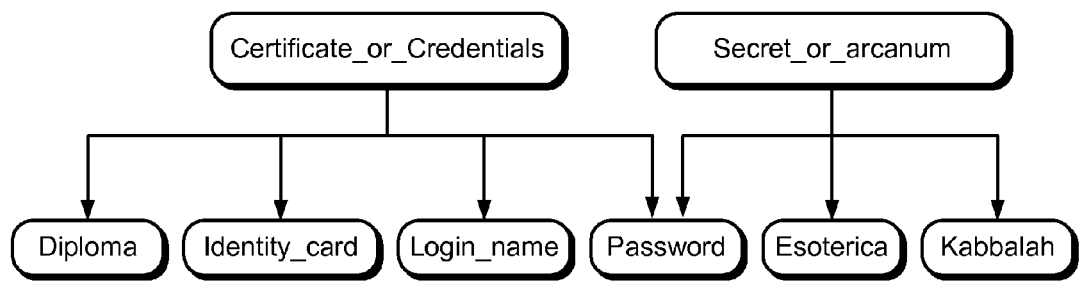
FIG. 5 depicts an example implementation of an ontology using a language-independent hierarchy.

Ontology may be represented as a language-independent concept hierarchy. This hierarchy may be represented using a directed graph with two types of edges, "is-a-kind-of" and "subsumes." In the example 500 shown in FIG. 5, for instance, a "password" is a kind of "certificate_or_credentials" and is a kind of "secret_or_arcanum". In turn, "secret_or_arcanum" also subsumes "esoterica" and "kabbalah", while "certificate_or_credentials" subsumes "login_name", "identity_card", and "diploma".

Representation of Intents by Graph Patterns

For illustration purposes, suppose the conversational agent 104 has been designed to help users change their password on the web site that embeds the conversational agent's user experience 112. A user may express this request in a variety of ways. Consider, for example, the user utterances: "How does one change one's password?", "How to change password," "How should I go about changing my password," "Need to change my password. How do I do that?", and "Would you be so kind as to tell me how to modify my password?" Each of these wordings contain the concepts "how" and "change password," with substantial variation in the exact way these two concepts are linked to each other, as well as in the use or omission of pronouns.

Figure 6:
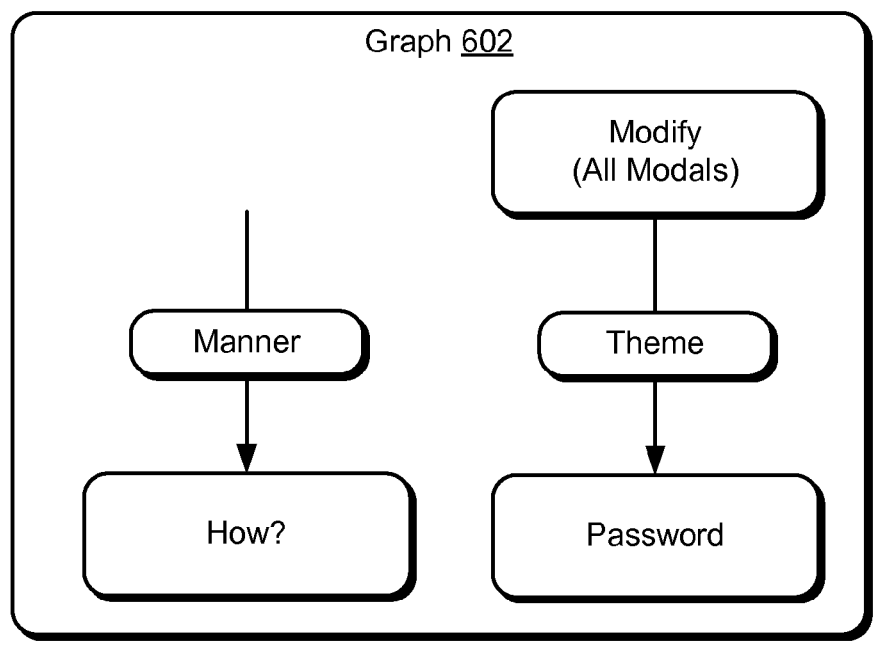
FIG. 6 depicts an example implementation of a semantic graph pattern that includes graph fragments.

One way to capture an intent common to these utterances is through use of semantic representations that contain graph fragments. FIG. 6 depicts an example implementation 600 of a graph pattern 602 that includes graph fragments for (1) "change password" (with "password" functioning as the theme of "change"); and (2) "how". These fragments form a graph pattern (which, for purposes of the discussion that follows, may be simply referred to as a "pattern"). An utterance is considered as matching this pattern if each of the pattern fragments occurs in a semantic graph of the utterance. It should be noted that this is a condition that is considered sufficient for matching; further discussion of this and other conditions may be found in relation to the following section.

Figure 7:
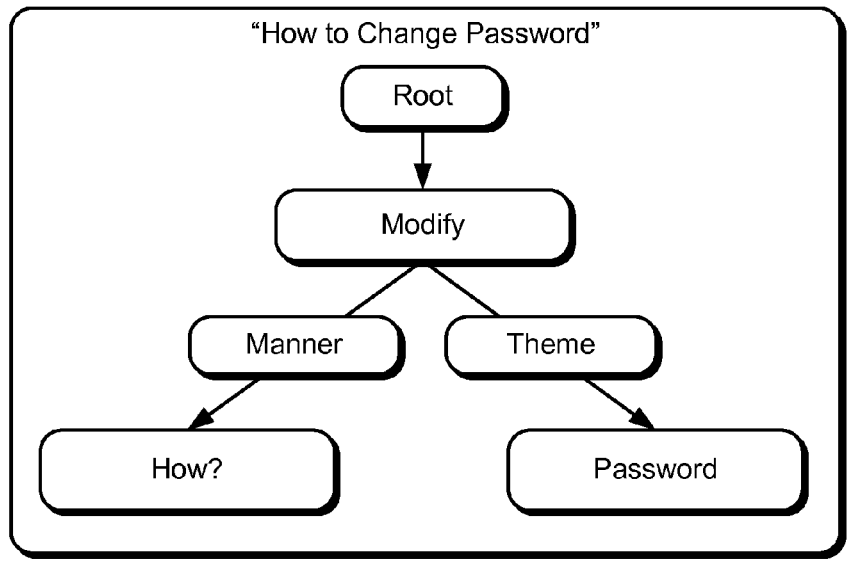
FIG. 7 is an illustration of an example implementation showing examples of semantic graphs corresponding to utterances that match the two fragment graphs making up the graph pattern of FIG. 6.
Figure 7:
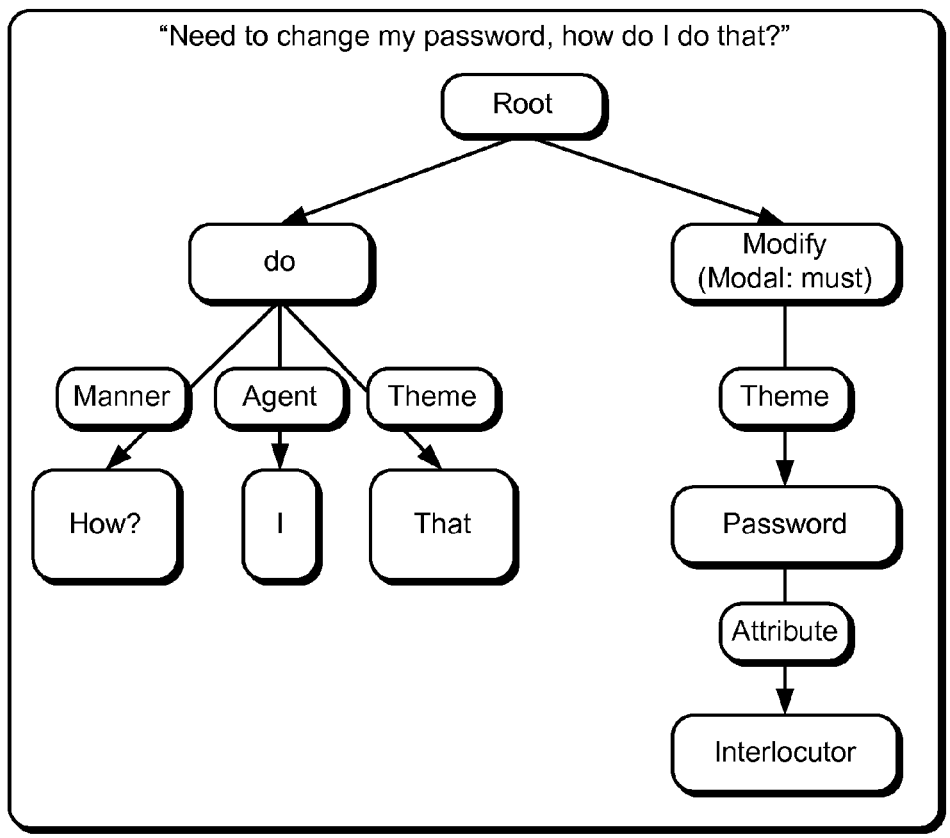

For example, semantic graphs for "how to change password" and "need to change my password. How do I do that?" both contain these fragments, examples of which are illustrated in the implementation 700 of FIG. 7. In this implementation 700, examples of semantic graphs that match the two graph fragments 602 of FIG. 6 are shown.

Trait Matching

Suppose the conversational agent 104 has been created to explain how to change credentials (i.e., user ID and/or password) rather than a password, specifically. Accordingly, a pattern may be defined to match questions about how to change one's password as well as a user ID or other credentials. This is an example of a situation in which information to be provided by the conversational agent 104 may be described by a general concept that subsumes a number of more specific concepts that are likely to occur in user utterances. For example, the conversational agent 104 may deliver generic information about connecting an Internet router, but requests for this information are likely to mention specific router brands and models.

Concept subsumption may provide flexibility to the conversational agent 104. In implementations, the conditions that are to be met for a match to be considered between a semantic graph and a pattern are stated as follows: A pattern matches a semantic graph if and only if a subgraph of the semantic graph subsumes the pattern. Continuing with the previous example, a simple example of graph subsumption would be the semantic graph for "change credentials" as subsuming the graph for "change password," an example of which is shown in the implementation 800 of FIG. 8.

Figure 8:
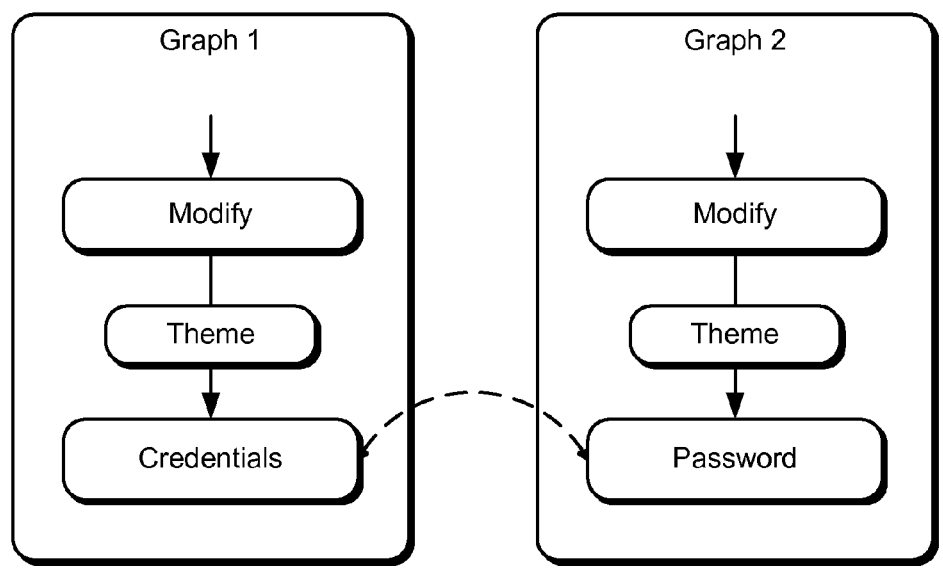
FIG. 8 is an illustration of an example implementation of subsuming graphs.

In FIG. 8, given that ontology defines "password" as a child of "credentials" as previously discussed in relation to FIG. 4, Graph 1 subsumes Graph 2 in this implementation 800. More generally, a graph g1 subsumes a graph g2 if and only if g2 can be transformed into g1 by zero or more applications of the following operations:

Delete a node and its incoming edge from g2;
Delete a trait from a g2 node; or.

Replace the value of a trait in g2 by another value that subsumes it.

Trait subsumption has been illustrated in FIG. 8 for concept traits. However, it should be noted that trait subsumption may be defined on a variety of traits, including function labels on edges. Here are other examples:

The modal value "MAY or MUST" subsumes the value "MUST".

The generic edge label "Attribute" subsumes each other edge label (for example, "Agent," "Theme," "Location," etc.).

Subsumption for modal values is based on sets of possible values. Either a trait takes its value in a hierarchy (e.g., edge labels, ontology concepts) or in a collection of sets. For example, the modal value "MUST" is really a singleton set that includes a single instance of "MUST."

Representation of an Intent by a Set of Graph Patterns

In addition to capturing stylistic variations on a question, matching also helps capture logically distinct but equivalent ways of expressing the same intent. For example, a user might ask how she can change her password by typing, "How can I change my password?" or by typing, "Can you help me change my password?" Therefore, a single intent is not usually captured by a single graph pattern. Accordingly, several graph patterns may be used. This set of patterns forms a logical disjunction, meaning that, in order to match the intent, a user utterance matches at least one of the patterns.

Matching Algorithm Example

A set of possible intents may be associated with each position in a conversational agent's 104 decision tree 120. This set is the union of the intents of the child nodes at that position in the decision tree 120. Each of the possible intents at the current decision tree 120 position is represented by a set of graph patterns. The set of patterns collectively representing each of the possible intents at a current position are referred to as the active patterns in the following discussion.

Matching Algorithm Outline Example

Given an utterance and a current position in the conversational agent's 104 decision tree 120, the conversational agent 104 may perform the following steps to determine user intent:

1. Retrieve the active patterns at a current position.
2. Match each active pattern against the semantic graph of the utterance.
3. Assign a matching distance to each successful match between the semantic graph of the utterance and an active pattern.
4. Select the intent represented by the active pattern with the smallest matching distance.

If no successful match can be found in step 2 above, we say that the utterance is unmatched. In such a case, the conversational agent may not have the linguistic knowledge to assign an intent to this utterance.

Matching Distance

A number of metrics may be used to measure a distance between a graph of an utterance and a matching graph pattern in the conversational agent's knowledge. These metrics may combine one or more of the following quantities algebraically:

1. The amount of information contained in matching pairs of trait values.
2. The semantic distance between the trait values in a matching pair.
3. The amount of information contained in sentence nodes and edges outside the matching subgraph.

In implementations, a metric formula is used to compute a distance that decreases with quantity 1 and increases with quantities 2 and 3. These constraints correspond to the semantic "closeness" of the semantic graph and the pattern it matches.

The amount of information in trait values may be measured in a number of ways:

In one such approach, a node's traits collectively count as a constant (typically equal to 1). Therefore, quantity 1 does not vary for a given pattern and quantity 3 is simply a number of nodes that are not involved in the match.

Other such approaches may use a specificity metric. For example, trait values may be considered to have increasing specificity as the number of occurrences in utterances decreases. This may be captured by computing an inverse of a proportion of utterances containing a given trait value. This measure may also be referred to as inverse frequency.

The matching distance between two trait values (quantity 2, henceforth called subsumption distance) may be computed as a function of:

Characteristics of a shortest path from one concept to another in a concept hierarchy; and Proper containment or equality for subset subsumption (as, for example, with modal trait values).

In various implementations, the number of graph nodes is used as a measure of information and the trait distance is proportional to the number of hierarchy levels linking two concepts or two edge labels.

Indirect Patterns

The conversational agent 104 may also leverage indirect patterns that are assigned low confidence and may be used in cases when the conversational agent 104 is not "sure" of the user's intent. Exclusive, or direct, patterns may take precedence over non-exclusive, or indirect, patterns when identifying a user's intent by the conversational agent 104. If the user's utterance does not match one or more direct patterns, each indirectly matching intent may be considered as potentially relevant. The conversational agent 104 may then offer the user a list of question rewordings or a list of potentially relevant topics or questions. This may occur when a user has entered several keywords but not a full sentence or phrase that more fully describes what is being requested.

For example, a user may type "cashback" which might mean "How does cashback work?" or "I never received my cash back." A designer of the conversational agent 104 may address this situation in a variety of ways, examples of which include the following:

1. Define a "cashback" intent (with an associated direct pattern) that elicits a question from the agent to determine whether the user is attempting to solve an issue or is merely inquiring about cashback.
2. Attach an indirect pattern for "cashback" to both intents.

The first method may be useful in specific situations for conversational agents where several keywords or ideas are used throughout by the agent in a wide variety of contexts. Therefore, more precise information is to be gathered to differentiate between them. The second method (that relies on indirect patterns) makes it possible to deal with intent ambiguity with minimal demands on designer time.

Example Semantic Clustering Features

Semantic clustering may be performed to provide a variety of functionality. For example, semantic clustering may be performed to group a corpus of user utterances into zero or more semantic clusters where each cluster corresponds to utterances that pertain to the same or to similar topics. This similarity of utterances inside each cluster may be used for a variety of purposes, further description of which may be found below. Furthermore, this similarity may be used as an input to a human reviewer, to a machine learning algorithm, to an A/B testing algorithm to improve performance of the conversational agent, or to an alerting system which may identify or react to new or existing user issues, among other applications.

Unidentified or Partially Identified Intent

A designer of the conversational agent 104 (also called reviewer) may improve the quality of a conversational agent 104 by examining the user utterances that are not matched to a direct intent pattern and/or that get matched to indirect patterns exclusively. Review of these utterances by the designer may indicate whether new intent patterns or new topics are to be added to the agent's content. This review may be performed in a variety of ways, further discussion of which may be found in relation to the following sections.

Traditional ad-hoc approaches that selected random utterances or conversations were inefficient and could miss issues. By using semantic clustering, however, the quality of the conversational agent 104 may be increased by:

- Taking into account a statistically significant portion of the utterances seen by the conversational agent.
- Allowing reviewers to focus on high-impact issues first, without using a system for categorization in advance.
- Presenting reviewers with a sufficiently large set of sample utterances that correspond to the same issue so that high-quality patterns can be generated.
- Ability to automatically suggest high-quality patterns to the reviewer. Furthermore, the reviewer is given the possibility to modify these patterns before adding them to the conversational agent.
- Ability to estimate the impact of the new patterns on future conversations, before the patterns are added to the conversational agent.

Erroneous Intent Identification

In some instances, user utterances may be matched to a wrong intent. Typically, this occurs because patterns that were previously inserted into the conversational agent's configuration are too general or are simply wrong. Traditional ad-hoc techniques that were developed to address these challenges would rely on reviews or testing of randomly selected utterances or conversations, and detection of manifestations of disinterest, disapproval or hostility from the user. This ad-hoc approach suffers from lack of prioritization and amount of time required. Further, many users ask their question, receive an answer, and simply close the conversational agent, thereby giving no indication whether the answer provided really answered their question.

Through use of semantic clustering described herein, however, a reviewer may spot erroneous intent identification by:

- Focussing on the high impact topics first; and
- Being able to examine just the outliers, i.e., user utterances pertaining to a given topic that have the highest probability of being wrongly identified.

Identification of Salient Topics in a Body of Utterances

Identification of the most salient topics in a body of utterances may be employed in a variety of areas. For example, such identification may be conducted for marketing purposes, for identifying strong and weak points of a service, for identifying new topics that are being discussed by users, for analyzing the evolution of topics over time, for creating a new conversational agent using content from pre-existing sources, and so on.

Additionally, the utterances can originate from text-based chats with the conversational agent 104, text-based chats with live people (e.g., live chat interactions or instant messaging), from emails, SMS, blogging or micro-blogging sites, social networking sites, phone transcripts, or any other form of communication that may result in the production of a body of utterances that may be parsed into semantic graphs.

One such area that may employ the identification techniques is to identify evolution of a topic profile of a communication channel over time. In particular, topic evolution may be tracked in near-real time and be used to assess the significance of topics as topics come into prominence in order to react to the situation that caused the topics to become prominent.

Another such area is to compare two or more distinct utterance corpora with respect to their respective major topics, e.g., to provide identification of common and distinct topics. In addition to the qualitative information about topics, quantitative information regarding the occurrence frequency or the occurrence time of each topic may also be provided.

On the other hand, topic identification offers the possibility of using analytics data to improve a conversational agent. For example, an analytics tool (such as a web analytics tool or BI tool) may produce various metrics such as measures of conversation success based on the combination of elementary criteria (e.g. whether the user thanked the agent at the end of the conversation, or whether the interaction resulted in a sale), and filter these results by time of the day or time period. However, unless such measures can be viewed per topic, analytics results are generally not actionable for improving a conversation agent, because the results may be aggregated across a multitude of conversations and topics without an indication of content areas that are to be improved.

By allowing a reviewer to look at conversation metrics aggregated per cluster, semantic clustering makes it possible to identify topics having a relatively higher priority for pattern-matching improvement. This identification may be performed based on the values of the aggregated metrics and on various conversational agent-specific criteria.

Identifying the Topic of an Arbitrary Utterance in a Corpus

Once a set of semantic clusters for a corpus is available, attaching a given utterance to a cluster can provide information about the utterance's topic, and more especially about the topic's importance. This would be otherwise difficult for a reviewer to do without reading a relatively large sample of the utterances in the corpus.

For instance, consider a conversational agent that helps users with selling their items online. If a reviewer looks at the utterance "I would like to sell a model car," the reviewer have no direct way of knowing how frequent this topic actually is; note this topic is very different from the one denoted by utterances such as "I would like to sell a car" or "I would like to sell a Ford". Cluster attachment can provide this information in addition to the particular utterance at which the reviewer happens to be looking. In this particular example, cluster attachment may help the reviewer understand at a glance that "I would like to sell my model car" is not a frequent topic for this conversational agent.

Since cluster sizes are a good indication of the prevalence of a topic, cluster attachment enables a reviewer to assess the seriousness of failure by the agent to correctly respond to a particular utterance. Without the ability to reliably carry out such assessment, contingent feedback from reviewers and other interested parties are prone to lead to futile or even detrimental improvement efforts. The latter occur when remedying an issue in a minor area may cause a regression in an important area.

In addition to providing frequency information about the topic underlying an utterance, cluster attachment also leads to topic identification, which has useful applications for displaying utterances in a UI and allowing an agent to respond helpfully to sentences whose intent has not been identified by other means than topic identification.

Semantic Clustering of a Corpus of Utterances

Clustering in general may involve an array of techniques that use a distance metric in order to subdivide sets of objects into one or more groups of closely related objects.

Semantic clustering is an approach that is based on the clustering of semantic graphs that are produced by a linguistic analysis process such as the one previously described in the Matching User Input Utterances to User Intents section, using one or more of the distance metrics described below or elsewhere. The objects that are clustered in this context are the semantic graphs produced by linguistic analysis. The clustering of semantic graphs induces a clustering of the corresponding utterances that generated these graphs; thus use the term "semantic clustering" may refer to both clustering of semantic graphs and clustering of utterances.

Provided a suitable distance metric is used, semantic clustering amounts to grouping utterances by user intent or topic, even though users may describe the same user intent or topic in different utterances using different words and grammatical structures.

When applied to a corpus of user utterances that have failed to be matched to a specific direct and/or indirect intent (henceforth called "unmatched utterances"), semantic clustering enables reviewers to:

Focus their attention on one user intent or topic at a time rather than one utterance at a time. A user intent or topic may contain tens, hundreds, or even thousands of user utterances.

Use cluster sizes (i.e., the number of user utterances in each cluster) to assess pervasiveness of a user intent, topic or problem.

Generate or validate patterns through examination of a plurality of examples of actual user utterances that are related to the same topic.

In an implementation, a corpus having a size between 10,000 to 100,000 unmatched user utterances is used for semantic clustering. However, fewer unmatched utterances may be used for cases where the volume of data is relatively small, and larger numbers of unmatched utterances may be clustered for conversational agents (or other text corpora) that have a sufficient volume of conversations. The number of utterances may also be chosen depending on whether the semantic clustering is to be done on a near real-time basis.

Sentence Representation

Sentences and other user utterances are represented by their semantic graphs, which may be a result of the parsing process described in the Matching User Input Utterances to User Intents section previously. It should be noted that this in itself may provide an initial level of clustering. For example, in a corpus of 50,000 utterances, the same semantic graph may be used to represent 10 to 20 different utterance forms.

Proximity Metrics

Semantic clustering may be used to create groups of utterances that, for a human reviewer, are intuitively close to each other because they are related to the same or to similar topics. To quantify this intuitive notion of semantic closeness, a number of proximity metrics may be defined to compare two or more semantic graphs. For example, concept-set proximity and graph-intersection proximity may be used. Both types involve taking a ratio of an aggregate specificity of semantic objects common to the two graphs to the aggregate specificity of each of the semantic objects found in the two graphs. In other words, these metrics represent specificity of common concepts divided by overall specificity.

Specificity will be further discussed in the following section. However, generally, the less frequently a term occurs in a reference corpus, the more specific the term may be considered. Therefore, the inverse of a term's frequency may be used as a reliable measure of specificity. The aggregate specificity of a number of different concepts may be computed by taking the sum of their specificities.

Concept-Set Proximity Metric

The concept-set metric may be used to map each of the semantic graphs to a set of concepts and metaconcepts that it contains. The concepts are the concept traits of the graph nodes. Metaconcepts are the values found for modal traits and "referent" traits (e.g., affirmative, negative, interrogative, interrogative-negative).

The concept-set proximity of two graphs $g1$ and $g2$ may be defined as the ratio of the aggregate specificity of common concepts and metaconcepts to the aggregate specificity of each of the concepts and metaconcepts found in $g1$ and $g2$.

Graph-Intersection Proximity Metric

In an implementation, the graph-intersection metric assigns a proximity to a pair of graphs $g1$ and $g2$ in the following way:

1. Using an intersection heuristic, find the most informative graph that subsumes both a subgraph of $g1$ and a subgraph of $g2$, where a graph's informativeness is directly related to the precision of the traits it contains. Call this graph $g1*g2$.
2. Divide the aggregate specificity of $g1*g2$ by the average of the aggregate specificities of $g1$ and $g2$.

Two example heuristics have been defined to carry out the intersection step 1, as detailed below in the "Intersection Heuristic 1" and "Intersection Heuristic 2" sections.

The intersection heuristics use a concept of "ontology distance" between two concepts. The ontology distance between two concepts $c1$ and $c2$ is defined as a pair $(d, h)$, where d is the length of the path in the concept hierarchy from $c1$ to $c2$ via their closest common ancestor, and h is the larger of (the distance between $c1$ and the closest common ancestor) and (the distance between $c2$ and the closest common ancestor).

For example, the ontology distance between a concept and itself is $(0, 0)$. Between a concept and a parent concept, the ontology distance is $(1, 1)$, while between two sibling concepts, the ontology distance is $(2, 1)$.

In addition, for the purpose of defining the intersection heuristics in the following discussion, the following may hold true:

The pair $(t, v)$, where t is a trait name and v a value, represents a valuation for trait t.

A node in a semantic graph includes a set of trait valuations and an identity.

The set of trait valuations in a node is a total function over the set of available trait names.

Assigning in a node n the special value nil for trait t is equivalent to saying that n does not bear trait t.

A graph node n subsumes two nodes $c1$ and $c2$ as closely as possible if for all valuations $(t, v)$ in n, the corresponding valuations $(t, u1)$ and $(t, u2)$ in $c1$ and $c2$ are such that v subsumes $u1$ and $u2$ as closely as possible.

For all trait values v, v subsumes v and nil as closely as possible.

When trait values $u1$ and $u2$ are objects in a hierarchy (like, for example, the ontology, or the one-level hierarchy of edge labels, with root Attribute), value v subsumes $u1$ and $u2$ as closely as possible if and only if v is the closest common ancestor of $u1$ and $u2$.

When trait values u1 and u2 are not members of a hierarchy, the values are set valued; and value v subsumes u1 and u2 as closely as possible if and only if v is the union of u1 and u2.

Edge label l subsumes labels m1 and m2 if and only if m1, m2 and l are equal or l is Attribute.

Edge label l subsumes labels m1 and m2 as closely as possible if l subsumes m1 and m2 and either l is not Attribute or m1 is not equal to m2.

The subsumption specificity of two trait values u1 and u2 and a subsuming value v is a function of
- an aggregate function of the specificities of u1, u2 and v, viz. max, mm or average,
- in the case of a hierarchical trait (like ontology concept),
  - the ontology distance (d, h) between u1 and u2,
  - the number of hierarchy members at distance (d, h) from v.
- in the case of a set-valued trait,
  - the number of values in v (which equals the union of u1 and u2),
  - the number of values in the intersection of u1 and u2.

In an example implementation, the subsumption specificity of two trait values u1 and u2 and a subsuming value v has been defined as the product of:
- the minimum of the specificities of u1, u2 and v, where the specificity of a set value is the minimum of the specificities of its members,
- a discount factor equal to:
  - in the case of a concept trait, $0.5^d$, where (d, h) is the ontology distance between u1 and u2,
  - in the case of a set-valued trait or of edge labels, the value 1.

Intersection Heuristic 1

The following is an example definition of IntersectionHeuristic1(node1, node2, resultNode):

Let (dMax, hMax) be a greatest ontology distance to be considered.

For h:=0 to hMax, do
  For d:=h to dMax do
    For each pair (c1, c2) of children of node1 and node2 that have not been marked as used
      If the concepts for c1 and c2 lie exactly at distance (d, h) from each other, then
        Create a new node n that subsumes c1 and c2 as closely as possible.
        Create a function edge from resultNode to n, with a label subsuming the functions of c1 and c2 as closely as possible.
        Associate with n its subsumption specificity.
        Recursively call IntersectionHeuristic1(c1, c2, n).
        Mark c1 and c2 as used.

The following is an example initial call to IntersectionHeuristic1: IntersectionHeuristic1(root1, root2, resultRoot), where root1 is the root of g1, root2 is the node of g2 and resultRoot is a newly created node with concept trait Top (i.e., the most general concept in the concept hierarchy).

The following is an example of use of IntersectionHeuristic1: After IntersectionHeuristic1 terminates, resultRoot is the root of g1*g2. In order to compute the aggregate specificity of g1*g2, sum the subsumption specificities associated with all the nodes of g1*g2.

Intersection Heuristic 2

The following is an example of construction of a map "ConceptSet:"

For each graph g in the list (g1, g2) containing the two graphs to intersect,
  For each node n of graph g in inverse breadth-first order,
    Set ConceptSet[n] to the set of concepts and metaconcepts occurring in n and its incoming edge if it exists.
    For each child c of n,
      Set ConceptSet[n] to the union of ConceptSet[n] and ConceptSet[c].

An example algorithm outline is now described as follows:
Construct the map ConceptSet.
Call IntersectionHeuristic2(root1, root2, resultRoot), where root1 is the root of g1, root2 is the node of g2 and resultRoot is a newly created node with just one trait, which is the concept Top.

An example definition of IntersectionHeuristic2(node1, node2, resultNode) is now described as follows:

Compute a matrix M of proximities between each child of node1 and each child of node2. Each entry M[c1, c2] of this matrix equals the concept-set proximity between c1 and c2, e.g.:

$$\frac{\text{specificity}(ConceptSet(c1) \cap ConceptSet(c2))}{\text{specificity}(ConceptSet(c1) \cap ConceptSet(c2))}$$

where specificity(s) denotes the aggregate specificity of concept set s.

Let minProx be a value such that, if M[c1, c2]<minProx, then any node n subsuming c1 and c2 is considered to contain no useful information. Compute a list L of mutually disjoint pairs (c1, c2) sorted in decreasing proximity order. The first pair (c1, c2) is the pair maximizing M[c1, c2], the second pair (c3, c4) is such that (c3≠c1 and c2≠c2 and c4≠c1 and c4≠c2) and M[c3,c4] is the pair maximizing M[c3, c4] with values thus constrained, and similarly for subsequent pairs. The length of the list L will thus be equal to the smallest of (the number of children of node1) and (the number of children of node2); every child of node1 or node2 will occur at most once in L.

For each pair (c1, c2) in L from highest to lowest proximity:
  Create a new node n that subsumes c1 and c2 as closely as possible.
  Let l be the edge label subsuming the semantic functions of c1 and c2 as closely as possible.
  If (l is not Attribute) or (M[c1, c2]>minProx), then
    Create a function edge from resultNode to n, with label subsuming the functions of c1 and c2.
    Associate with n its subsumption specificity.
    Recursively call IntersectionHeuristic2(c1, c2, n).

Reliability of the Intersection Heuristics

Intersection heuristic 1 yields a maximally specific intersection except in cases where two very dissimilar nodes dominate very similar lists of nodes. In so far as, in semantic graphs, the semantics of a node determines the semantics of the nodes it can dominate, this problem does not occur frequently.

On the other hand, intersection heuristic 2 takes into account each of the concepts in sub-trees dominated by 2 nodes c1 and c2 prior to pairing them and is therefore robust with respect to the risk of finding similar node lists under dissimilar nodes.

In terms of robustness, intersection heuristic 2 may be considered close to the optimal intersection algorithm, which would rank pairs based on their graph-based proximities. But while the running time of the optimal algorithm, even if implemented with dynamic programming, is exponential in the product of the depth of the shallower graph and the largest child list, heuristic 2 is linear in the number of graph nodes. Therefore, from a computational complexity point of view, heuristic 2 is suitable for computing an intersection of a set (or corpus) of graphs rather than just two graphs, as described in the "Precision Feedback" section of the discussion.

Specificity Metrics

Use of inverse frequency as a specificity metric generally provides a sufficient approximation to measure the specificity of a concept, i.e., its ability to characterize a specific topic. However, topic selectivity may be measured in a more direct way, namely by comparing a unigram distribution of concepts in a corpus with a conditional distribution of terms in utterances containing the concept to measure. For example, a neutral concept like "interlocutor" typically occurs in a sub-corpus whose concept distribution does not essentially differ from the distribution of terms in the whole corpus. Conversely, a specialized concept like "spark plug" typically occurs in utterances forming an automotive subcorpus, meaning that in this subcorpus automotive terms will be overrepresented and terms representative of other specialized topics (e.g., cooking or finance) are underrepresented with respect to the overall corpus. A variety of heuristics may be used to perform such a comparison between distributions, examples of which include vector-space sine and the Kullback-Leibler divergence.

Use of Proximity Metrics

Concept-set proximity generally yields results that are less precise than graph-intersection proximity because the former does not take into account the shape of the graphs.

In one implementation, clustering may be based primarily on a concept set-based proximity metric; in an alternate implementation, clustering may be based on a graph-proximity metric. However, two-level hierarchical clustering, as described in the "Two-Level Hierarchical Clustering" section, may make use of the same or different proximity metrics for each level; for instance, in one implementation, the first-level clustering may use concept-set proximity, while the second level may use graph proximity.

On the other hand, graph intersection may be used in its own right to produce a graph to be used as a decision-tree pattern, as described in the Pattern Generation section. In this context, intersection heuristic 1 is primarily used. However, in an alternate implementation the results of both heuristics may be compared for added precision, as described in the Precision Feedback section.

Quality Threshold Clustering

The semantic clustering algorithm is based on an algorithm named Quality Threshold (or QT) clustering. It can be outlined as follows:

Let SG be the set of semantic graphs corresponding to the user utterances to be clustered.

Let QT be the chosen quality threshold value.

Let C be the set of generated clusters. Initially C is the empty set.

Repeat:
   For each semantic graph s∈ SG, associate with s a candidate cluster containing just s. Let Candidate(s) denote this candidate cluster.
   For each semantic graph s1∈ SG,
      For each semantic graph s2∈ SG,
         If s1 !=s2 and if the proximity between s1 and s2 is at or above QT, add s2 to Candidate(s1). [Step A]
   If each candidate cluster contains exactly 1 member, then Terminate.
   Let Candidate(S) be the largest candidate cluster.
   Add Candidate(S) to C. [Step B]
   For each semantic graph s∈ Candidate(S), remove s from SG. Go to Repeat.

The result can now be found in C. SG will contain the set of unclustered semantic graphs.

The value of QT may be determined through experimentation to strike a good balance between cluster homogeneity and low cluster fragmentation. Cluster fragmentation is defined as the scattering across several clusters of utterances pertaining to the same topic. Cluster homogeneity is defined as the extent to which different utterances that have been clustered together actually pertain to the same topic. For example, when clusters are not sufficiently homogeneous, a smaller number of clusters may be generated; however, the clusters may contain user utterances that are not highly related. On the other hand, if there is a high level of cluster fragmentation, a relatively larger number of clusters may be generated that are not easily reviewable, since similar utterances may not be grouped together in the same cluster.

A variety of proximity metrics may be used in the above algorithm, examples of which may be found in the "Proximity Metrics" section. Since these metrics yield the same value for pairs of semantic graphs (s1, s2) regardless of the exact membership of SG, the basic QT clustering algorithm described above can be optimized as follows:

Let SG be the set of semantic graphs corresponding to the user utterances to be clustered.

Let QT be the chosen quality threshold value.

Let minClusterSize be a parameter of the algorithm denoting the minimum cluster size, such that minClusterSize≥1.

Let C be the set of generated clusters. Initially C is the empty set.

For each semantic graph s∈ SG, associate with s a candidate cluster containing just s. Let Candidate(s) denote this candidate cluster.

For each semantic graph s1∈ SG,
   For each semantic graph s2∈ SG,
      If s1 !=s2 and if the proximity between s1 and s2 is at or above QT, add s2 to Candidate(s1). [Step A]

Repeat:
   Let Candidate(S) be the largest candidate cluster. Let |Candidate(S)| denote the number of members in Candidate(S).
   If |Candidate(S)|<minClusterSize then Terminate.
   Add Candidate(S) to C. [Step B]
   For each semantic graph s∈ Candidate(S), remove s from SG and from Candidate(s') for all s'.
Go to Repeat.

The following variations on the definition of cluster size provide different ways of identifying the largest cluster candidate.

The size of a cluster is the aggregate frequency of its members in the set of utterances.

The size of a cluster is the number of unique lexically normalized utterances (normalization is performed for case, spacing, etc.).

The size of a cluster is the number of unique semantic representations for its members.

In addition, in an alternate implementation the following variation may be made on the threshold criterion in Step A above:

If (s1 !=s2) and (for every semantic graph sk belonging to Candidate(s1), the proximity between sk and s2 is at or above QT),
    then add s2 to the Candidate(s1). [Step A']

The above may be referred to as the diameter criterion. It is opposed to the standard radius criterion (Step A) that stipulates a maximum distance to one distinguished cluster member.

In addition, in one implementation, the following variation (called transitive clustering) may be made to Step B:

[Begin Step B']
Set worklist to a copy of Candidate(S).
While worklist is not empty, do
Remove an arbitrary semantic graph s1 from worklist.
Let Candidate(s1) denote the cluster candidate for s1.
For each semantic graph s2 in Candidate(s1),
    If s2∉candidate(S) and the proximity between s2 and S is above some specified constant QT2, then
        Add s2 to candidate(S).
        Add s2 to worklist.
Add Candidate(S) to C.
[End Step B']

The constant QT2 may be chosen to be a lower threshold than QT. Transitive clustering strategy may reduce cluster fragmentation without impairing cluster homogeneity.

An implementation may use the radius criterion with transitive clustering and a quality threshold QT=0.65. These parameters may be particularly useful when clustering is combined with automatic pattern generation, which is described in the next section.

Pattern Generation

Because clusters of unmatched utterances may include utterances for whose intent no direct or indirect pattern has been defined, an addition to the semantic clustering algorithm may be made to add functionality to automatically generate patterns for a cluster. The patterns can be presented for inspection to a human reviewer (e.g., the designer of the conversational agent 104), who may then validate them and determine the desired intent for these utterances before adding the patterns to the conversational agent. Alternatively or additionally, the agent designer may modify the patterns before adding them, may decide to discard them altogether, and so on. In yet another embodiment, the association between pattern and intent can be performed automatically, e.g., without user intervention through execution of software such as machine learning or A/B testing.

The graph intersection heuristics described in the "Intersection Heuristic 1" and "Intersection Heuristic 2" sections detail basic building blocks for a pattern generation algorithm. For purposes of the following discussion, it should be noted that by virtue of the way in which it is constructed, the intersection g1*g2 of two graphs g1 and g2, when considered as a pattern, matches both g1 and g2. In addition, g1*g2 is likely to match other graphs that are similar to g1 and g2.

To ease the task of the agent designer, the pattern generation algorithm may yield patterns in order of decreasing specificity. For example, it may be easier to modify specific graphs, e.g., graphs with a multitude of nodes and traits, by the designer so as to capture the desired intent with the appropriate level of specificity. On the other hand, a pattern that is too generic is essentially useless because it can be easily overtaken by more specific patterns or matched incorrectly to utterances for which no appropriate patterns exist. Therefore, a designer reviewing a cluster's patterns in decreasing specificity order may find a point beyond which it is not desirable to continue the review. Once that point has been reached, the agent designer may decide to discard the subsequent suggestions.

The following outlines an algorithm for pattern generation, given a semantic cluster C:

For each semantic graph g1 ∈ C sorted by decreasing specificity
    If g1 has not been marked as matched
        For each semantic graph g2 ∈ C sorted by decreasing proximity to g1
            If g2 has not been marked as matched
                Let m be the set of semantic graphs in C matched by g1*g2.
                Record g1*g2 as a generated pattern.
                Mark each semantic graph of m as matched.

In an implementation, members of m are marked for exclusion from further intersections to avoid generating patterns that only include insignificant differences.

A further application of generating patterns for clusters is that the pattern projections form homogeneous sub-clusters, thereby providing useful hierarchical clustering. In implementations, clusters individually represent one or more closely related topics, while sub-clusters may each focus on a single topic. Viewing instances of closely related topics (as identified by sub-clusters) close to each other as part of a single cluster may be useful to assess missing content in the agent or risks of interaction between patterns identifying similar intents.

Precision Feedback

Once a pattern has been suggested, the reviewer may choose between a variety of options:

Associate the suggested pattern with a specified intent, and add the pattern to the configuration of the conversational agent.

Modify the pattern manually before performing the steps above. A graphical user interface may be used by the reviewer to modify the pattern manually.

Select one or more members of the projection m of the pattern inside the cluster C that should not be matched. The selection of these members may be done via a user interface. Once the desired members have been excluded, a new pattern may be computed by the system as described below, and the reviewer may continue working on this new pattern.

If the reviewer decides to exclude semantic graphs, the following approach may be used to generate a new pattern. If the two semantic graphs that have been intersected to generate the original pattern are still in the reviewer's selection, the process stops without a pattern being generated. If, however, one or both of the generating utterances have been excluded, the following algorithm may be launched to compute a more precise match than previously:

Let m' be the target projection; m' is obtained by removing the excluded semantic graphs from m.

Compute the intersection $g_1*g_2* \ldots *g_k$ of all semantic graphs $g_i \in m'$. Compute the projection of the resulting pattern and display it to the reviewer.

To compute the intersection of k graphs $g_1*g_2* \ldots *g_k$ using a binary intersection operation, any bracketing is valid, for instance $g_1*(g_2*(\ldots * g_k))\ldots)$, provided the implementation of the binary operation is associative. Since the intersection operations are heuristic approximations to the optimum, this is not guaranteed; but using intersection heuristic 2, which is close to optimal, provides a relatively high probability that the results will be bracketing-invariant.

This approach to pattern re-computation (viz., an intersection heuristic) may help to avoid reducing the precision of traits. In particular, unequal concepts may result in a closest common ancestor in the generated pattern. This means that if, after taking the intersection of the retained projection in its entirety, unwanted semantic graphs are still matched, either the choice of utterances to retain and exclude turns out to be contradictory or the intersection heuristic has failed to optimally pair up nodes. The risk of the second case may be minimized by applying intersection heuristic 2 rather than the slightly faster but less robust intersection heuristic 1, which is used for the initial match generation in an implementation.

Evaluation of Pattern Impact

In order to allow a designer to weigh the consequences of adding a generated pattern as-is or after modifications, functionality may be implemented to evaluate, based on an existing corpus of utterances, the impact of adding a pattern to the conversational agent's 104 decision tree 120. This impact is determined by the matching extent of the pattern, which will be described below.

An observation that supports this functionality is that the impact of a pattern on future utterances may be estimated by evaluating the impact of the pattern on a corpus of past utterances (i.e., on the available corpus of utterances). This is true for patterns that reoccur in user utterances over time, which is the case for patterns that have been obtained from semantic clustering.

Furthermore, adding a pattern that has no impact on past utterances only makes sense if the reviewer has foreknowledge of new utterances that are likely to be made by the users of the agent in the future. Lacking such foreknowledge, it is not likely that adding such a pattern will have an impact; for example, a pattern that is overly specific would have little to no measurable impact on the past or future behavior of the conversational agent.

To estimate the matching extent of a pattern based on a corpus of past utterances, the pattern can be simply matched against the semantic graphs of these utterances. Estimating the matching extent provides agent reviewers with heuristics to predict whether the most optimal patterns are being added to improve the agent's performance efficiently and without adding unneeded patterns.

In one implementation, matching extent estimation can be performed for suggested patterns. In an alternate implementation, matching extent estimation can be performed on either suggested patterns, suggested patterns that have been modified by the reviewer, or patterns that have been generated through other means (for instance, manually).

Matching Extent of a Pattern

The matching extent of a pattern p is the subset S of semantic graphs of the utterance corpus so that for every s∈S:

If s was an unmatched utterance, p obtains a direct match with s.

If s was an indirectly matched utterance that was matched by another indirect pattern p', p obtains a direct match with s.

If s was a matched utterance that was matched by another direct pattern p', p obtains a direct match with s and the matching distance for p is less than the matching distance for p'.

In order to be able to compute S, the utterance corpus contains the matching distance for each matched utterance. Alternatively or additionally, the identities of patterns involved in direct matches may be stored together with each semantic graph in the corpus and the matching distance may be computed "on the fly."

The matching extent is characterized quantitatively using the following definition of a matching percentile:

Let |L| be the number of semantic graphs of utterances in the utterance corpus L. Here we let |L| denote the cardinality of set L.

The matching percentile of a pattern p is the percentage of utterances in the utterance corpus belonging to the set L(p), i.e.:

matching percentile=100×(|L(p)|/|L|)

The set L(p) may be constructed as follows:

Let ext(p) denote the matching extent of pattern p.

Initialize L(p)=ext(p).

Whenever q is a pattern in the decision tree 120 of the conversational agent with matching extent ext(q) such that |ext(q)|<|ext(p)|, then ext(q) is added to L(p).

For example, the pattern (or patterns) with the largest matching extent has (or have) percentile 100%; on the other hand, the patterns with the smallest matching extent have a matching percentile of 100×s/|L|, where s is the smallest extent size for any pattern in the decision tree 120.

Figure 9:
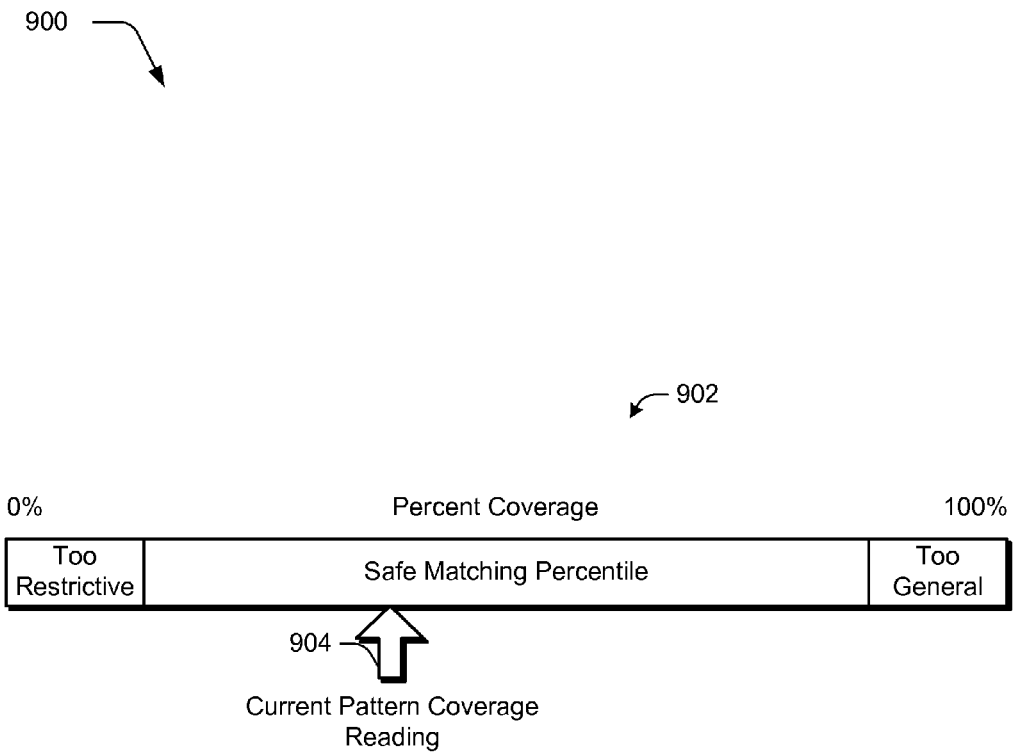
FIG. 9 illustrates an example of visualization of a matching percentile of a pattern using a meter.

FIG. 9 illustrates an example 900 of visualization of a matching percentile of a pattern using a meter 902. The meter 902 illustrates matching percentile coverage of a current pattern. A segment illustrated to the left in the meter 902 represents a relatively low matching percentile and a segment to the right in the meter 902 represents a relatively high matching percentile. If in the meter 902 the reading 904 is in one of these segments, this is to be interpreted as a warning that the current pattern coverage is overly restrictive or too general, respectively.

Potential Matching Extent of a Pattern to be Added

The potential matching percentile of a prospective pattern p can be estimated as described in the section "Matching extent of a pattern" above. This matching percentile may be shown using appropriate visualization such as the meter 902 in FIG. 9 for a designer to assess the impact of adding the prospective pattern p to the decision tree 120 of the conversational agent 104.

For increased precision, when computing the matching percentile of a prospective pattern p, the extents of existing patterns may be recomputed to take into account cases in which an utterance potentially matches p instead of the existing pattern p' that it was matching with previously.

In addition, the potential matching extent of the prospective pattern p may be presented to the reviewer by displaying a small subset of potentially matching utterances (for instance, on the order of 10). The subset includes utterances with the shortest matching distance to the new pattern. A selectable control (e.g., via a user interface) may be used to allow this set to be expanded to show the whole matching extent, if desired by the reviewer.

Utterance Stealing

When an utterance that was matched to a pattern q in the log becomes potentially matched to a prospective pattern p, this may be referred to as "p stealing this utterance from q." In addition, p may be said to steal this utterance from the node in the decision-tree 120 to which q is attached.

Sometimes, this stealing is desirable, as in the case of a new, more specific pattern stealing user utterances inappropriately matched to a wrong answer. In other cases, however, a new pattern may steal user utterances that were correctly matched previously. Therefore, in an implementation the features described herein may promote human oversight to understand whether a proposed pattern would improve or worsen the agent's overall performance.

The graphical user interface presents the following information for reviewers:

The list of nodes in the decision-tree 120 that the prospective pattern p is stealing from.

Associated with each node, the following information:
- A list of the patterns q that matched the stolen utterances in the log.
- Associated with each pattern q, the following information:
  - the utterances stolen from the pattern q,
  - a meter showing the matching percentile of q.

Visualizing the Potential Impact of a Review Process

At the start of a review process that examines the results of semantic clustering, it is desirable to provide the reviewer with a quantitative estimate of the impact that the review process may have on improving the conversational agent. For instance, if the review examines the results of clustering user utterances that have failed to be matched to specific intents with the goal of adding new patterns to the decision tree 120, it is desirable to provide an estimate of what the improvement of the conversational agent's matching performance may be after the review process has been completed.

Figure 10:
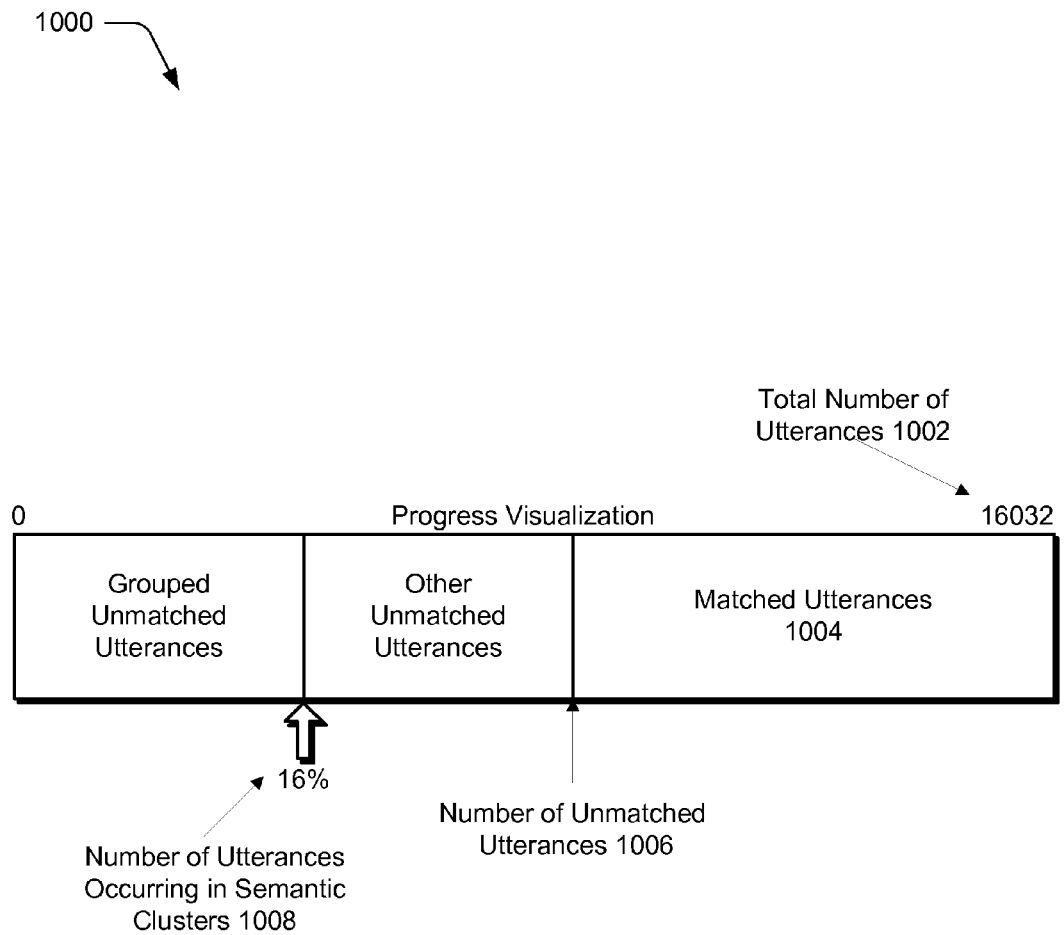
FIG. 10 illustrates an example implementation of information output via a user interface for review by a reviewer.

In an implementation, the following information 1000 may be shown to the reviewer, an example of which is illustrated in FIG. 10:
- The number of matched utterances 1004, with respect to the total number of utterances in the corpus 1002 (both matched and unmatched).
- The number of unmatched utterances 1006 (i.e., utterances not matching directly, including both utterances that the agent does not understand and utterances that trigger reformulations), with respect to the total number of utterances in the corpus 1002.
- Inside the above, the number 1008 of utterances occurring in semantic clusters of aggregate frequency of at least k.

This number or proportion 1008 provides a quantitative estimate of the potential improvement of the matching performance of the conversational agent that can be achieved during the current semantic clustering round.

The minimum aggregate frequency k is a parameter of the configuration. The aggregate frequency of a cluster is the total number of occurrences in the corpus of the utterances it contains. In implementations, semantic clusters that are less frequent than k are not worked on by a reviewer due to providing minimal leverage, although other implementations are also contemplated.

In an implementation example, when clustering corpora containing approximately 10,000 unmatched utterances, a value of k=5 typically results in approximately 200 clusters to review. In an alternate implementation, when a reviewer is concerned primarily with the most salient issues, setting k to the low teens may provide an optimal cluster selection.

Erroneous Intent Identification

Cluster Center

The contents of a cluster may be epitomized by displaying an utterance corresponding to the semantic graph having the least specificity in the cluster. The reason for this choice is that such an utterance primarily contains information that played a role while building the cluster. Choosing an utterance with a richer semantic graph may run a risk of displaying incidental information that is not representative of the cluster's topic.

In an alternative implementation, the cluster center may be defined as a most central utterance, where centrality is measured by the average of proximities to each member of a cluster. In case there is more than one most central utterance, the most frequent utterance among such most central utterances is selected to represent the cluster's topic.

Tuning Clustering Criteria to the Specificity Level of an Agent's Patterns

Clustering criteria includes the quality threshold, the threshold criterion (radius vs. diameter), a building method (e.g., transitive vs. intransitive), and a proximity metric.

Tuning semantic clustering includes the choosing of clustering criteria such that, in most cases, utterances matched by different patterns in a specified agent will go to different clusters.

In practice, there are a variety of practices for defining graph patterns in agents; so that it is necessary to tune clustering criteria to match the specificity level of a particular conversational agent.

Two-level Hierarchical Clustering

In an implementation, two-level hierarchical clustering includes applying a QT algorithm to a corpus of semantic graphs to obtain clusters and then applying the QT with more stringent clustering criteria on the set of semantic graphs in each cluster obtained in the first step to obtain subclusters.

Review Method for Erroneous Intent Identification

A variation on the semantic clustering technique described above may be applied to a corpus representing a set of utterances that have been assigned an intent by the agent, e.g., a set of matched utterances. In this case, semantic clustering attempts to classify by topic utterances that have already been assigned precise topics (namely, intents in the decision tree 120) by the conversational agent.

Two cases may arise, either each member of a cluster is assigned the same intent by the agent (convergent assignment) or members are assigned multiple intents (divergent assignment). The terms convergent cluster and divergent cluster may also be used to describe these cases.

Divergent assignment may mean that a cluster spans several different intents (heterogeneous cluster) and those intents have been correctly identified by the agent, in which case no corrective action is desirable. However, provided the quality threshold of the clustering process is tuned to the level of distinction the agent makes between intents, a majority of cases of divergence may arise when a heterogeneous cluster contains some utterances with incorrect intent assignment. Therefore, each case of divergent assignment may be presented for review.

Errors in intent determination may result in convergent clusters with a single missed assignment. Reviewing single convergent cluster for correctness may amount to reviewing one utterance representing an entirety of the cluster, namely the cluster center (due to homogeneity and convergence).

However, reviewing each convergent cluster could still prove too time-consuming in a complex conversational agent. Accordingly, in implementations the following review and semantic clustering scheme is implemented on a corpus of matched utterances:
- Clustering is performed hierarchically at two levels. Subclusters are obtained using clustering criteria tuned to the level of specificity of the agent's graph patterns.
- Only clusters containing divergent sub-clusters are offered for review. This means that both divergent and convergent sub-clusters are offered for review.

This approach leaves clusters that contain convergent subclusters out of the review, as it is likely that such subclusters have the least probability of containing erroneous intent assignments. Conversely, it is likely that, if a subcluster has been misassigned to a wrong intent, then there is a chance that some other sub-cluster of the same cluster may be partially misassigned and thus form a divergent cluster.

When, in the course of the review, intent misassignments are discovered, a variety of corrective actions can be under-taken by the reviewer, which include fixing or removing the pattern that mismatched, adding a more specific pattern to the correct intent in the decision tree 120, in order to allow this intent to capture the utterances in the subcluster, and so on.

Example Clustering Criteria

One or more implementations use concept-set proximity with a quality threshold QT=0.65, and a diameter criterion. On the other hand, one implementation of 2-level hierarchical clustering uses a diameter criterion with a quality threshold QT=0.65 at the upper level (cluster construction), and a diameter criterion with quality threshold QT=0.80 at the lower level (subcluster construction).

Identifying Salient Topics in a Corpus of Utterances

Semantic clustering based on natural language parsing and the proximity metrics outlined in the "Proximity Metrics" section (including 2-level hierarchical clustering as described in the "Two-level Hierarchical Clustering" section), may be used to feed clustering results to a graphical user interface. The graphical user interface may be employed by a reviewer to examine clusters, and subclusters if desirable, in order to understand what are the most popular topics for a corpus of utterances (e.g., user inputs performed via live chat, IM, SMS, email, social networking sites, blogging and micro-blogging services, etc.), as well as to obtain a quantitative indication of the prevalence of those topics in the corpus. The following lists techniques that may be employed to support this functionality.

Expandable Utterance Lists

A cluster can be represented by its center, as defined in the "Cluster Center" section. Additionally, a user selectable (i.e., clickable) user interface control associated with the cluster center may be used to expand the cluster to display its content.

For relatively large clusters, the graphs of its members may be sorted by proximity to the center so as to expand the center by the k closest graphs (where typically k=10); the graphical user interface may show the respective content through a specific command. Proximity to the center may be computed using a variety of metrics, examples of which were described in the Proximity Metrics section, e.g., concept-set proximity.

Cluster Identification Across Two or More Sets of Clusters

If multiple semantic clustering rounds are performed, e.g., on corpora corresponding to different time intervals, techniques may be employed to match clusters from the two sets that correspond to the same topic. Such clusters may be referred to as "same-topic" clusters in the following discussion. It should be noted that a simple comparison of cluster member utterances (or semantic graphs) may not be sufficient in some instances to determine if two clusters relate to the same topic. This is because the actual utterances and semantic graphs making up a cluster may vary from one corpus to the next.

Once same-topic clusters are identified between two corpora, a determination may then be made as to what clusters are present in the more recent corpus, and what clusters are absent from that corpus. This may correspond to the occurrence of new topics, or the disappearance of old topics, respectively.

Centroid-based Heuristic

While the clustering algorithm relies on the availability of a proximity metric, and may not involve the definition of a vector space in which to locate the objects to cluster, concept-set proximity provides the ingredients for defining a vector space.

To map a semantic graph g to a vector, each concept may be considered as a dimension and the coordinates may be set as follows:

If concept c is in the concept set of g, the coordinate for dimension c is set to the specificity of c.

If g does not contain concept c, the coordinate for dimension c is 0.

With this definition, it is possible to define the centroid of a cluster as the point whose coordinates are the averages of the coordinates of each semantic graph in the cluster.

The distance between the centroids of two clusters C1 and C2 may be computed and a decision made that C1 and C2 represent the same topic if this distance is below a specified threshold.

Center-Based Heuristic

The center of a cluster may be defined as its least specific member, an example of which was previously discussed in the Cluster Center section. A decision may be made, for example, that two clusters C1 and C2 represent the same topic if and only the set-based proximity of the respective centers is above a specified threshold.

In an implementation, the threshold is set between 0.95 and 1.0 although other implementations may also be considered. The center-based heuristic may be used in place of the centroid-based heuristic insofar as (1) the centroid has increased sensitivity to the presence of nonessential concepts than the center and (2) concept-set proximity is perceptibly more accurate than Euclidean distance.

Cluster Identification in Binary Comparison of Cluster Sets

To compare two cluster sets C1 and C2, their intersections inter(C1), inter(C2) and inter(C1, C2) may be computed as follows.

inter(C1), inter(C2) and inter(C1, C2) are initially empty.

For each cluster $c1 \in C1$,

For each cluster $c2 \in C2$,

If proximity(center(c1), center(c2))≥Identification-Threshold, then

Add c1 to inter(C1); add c2 to inter(C2).

Add the union of c1 and c2 to inter(C1, C2).

The sets inter(C1) and inter(C2) contain same-topic clusters from C1 and C2, respectively, determined based on the proximity identification criterion (as described above). However, for the purpose of displaying cluster members, they may be used as follows, respectively:

The set of clusters specific to C1 is the set:

C—inter(C1)

The set of clusters specific to C2 is the set:

C2—inter(C2)

If all same-topic clusters are to be displayed, the set of shared clusters inter(C1, C2) may be shown. In an alternate implementation, if it is desirable to show more recent clusters, inter(C2) may be used instead.

Applications and Methods

Clustering of a relatively large number of utterances may allow reviewers to identify prominent topics, based on the size of the resulting semantic clusters. This may have a variety of applications such as to make sense of large volumes of utterances efficiently and automatically. For example, an implementation may contain one or more of the following applications of semantic clustering: "Voice of the Customer" analysis, display of "hottest topics" for the benefit of social networking, online, or micro-blogging communities, identification of the top issues on support channels or real-time user feeds such as from social networks or micro-blogging sites, and so on. A variety of techniques may be employed to provide this analysis, an example of two of which is described as follows.

Corpus Selection to Focus on Specific Topics

For example, a company may seek knowledge of "what is utmost on its customers' minds" and therefore filter a corpus of utterances (consisting of messages or product opinions) to retain those utterances that contain references to specific products or topics, prior to identifying dominant topics in the retained corpus using semantic clustering.

Automated Topic Tracking

To track the appearance and disappearance of topics over time in a communication channel, a technique may be employed to cluster corpora built during time windows that may be close and/or overlapping. For instance, an implementation may use corpora of utterances built each day, by taking into consideration all utterances that have occurred over the last 5 days.

For example, a customer support department may be interested in knowing the top issues encountered by customers in real time so as to efficiently allot customer support operators. If this department offers a high-throughput automated chat, a one-hour sliding window may be used to track the main topics on an hourly basis. Topic appearance and disappearance may be brought to the attention of specialists by using automated topic tracking (i.e., without manual topic marking or a predetermined list of topics) the specialists may then decide whether these topics correspond to an underlying issue or to an issue resolution, respectively.

Automated topic tracking can be achieved by means of the approach described in the section "Cluster identification in binary comparison of cluster sets." If C1 is the set of clusters from a previous time window and C2 is the set of clusters from the current time window, then C1—inter(C1) may represent outdated clusters, while C2—inter(C2) may represent new clusters.

Automated topic tracking is also applicable across corpora that are not successors in a time series. For example, a company may be interested in comparing the dominant topics in user utterances obtained through different channels, such as blog contents, blog comments, micro-blogging sites, SMS, or conversations with humans and conversations with conversational agents, during a given time period. On the other hand, a company with operations or subsidiaries in several countries may be interested in identifying common topics across these operations from customer-support logs. In this case, the relevant output of the algorithm described in the section "Cluster identification in binary comparison of cluster sets" will be inter(C1, C2), which yields common topics.

Breaking Down Analytics Data by Topic

An analytics tool offers the possibility of associating other quantitative data beside frequency data with utterances in a cluster. For instance, the results of semantic clustering could be joined against the metrics derived by an analytics system (such as a web analytics solution or a business intelligence solution).

Furthermore, analytics data can be aggregated per cluster. For example, it could be of interest to a company to know which topics are most or least conducive to commercial orders (in this case, checkout completion and/or shopping cart value could be the relevant analytics metrics that are joined with the result of semantic clustering), or on the contrary cancelations (in which case shopping cart abandonment may be the relevant metric).

Some analytics measures, for example measures of conversation success, correlate with the quality of an agent's content and pattern matching Accordingly, aggregating such measures per semantic cluster and displaying the results to a reviewer provides straightforward clues to areas the reviewer needs to act upon in order to improve a conversational agent.

Identifying the Topic of an Arbitrary Utterance in a Corpus

The following lists some supporting techniques that may be used to implement the identifying features.

Diameter Proximity

The diameter proximity of an utterance s to a cluster C is defined as follows:

DiameterProximity(s, C)=average proximity of s to each member of C where proximity may be one of the proximity metrics that have been defined previously.

Topic Frequency

The topic frequency of an utterance s with respect to a cluster C with size |C| is defined as follows:

TopicFrequency(s, C)=DiameterProximity(s, C)*|C|

Cluster Attachment

Given a set of clusters S, an utterance s is said to be attached to cluster C $\in$ S if and only if C is the cluster that maximizes DiameterProximity(s, C') for any C' $\in$ S. If several clusters satisfy this definition, the cluster C among these several clusters that maximizes TopicFrequency(s, C) may be defined to be the attachment cluster.

Example Cluster Attachment Computation

Another technique for computing cluster attachment involves the same definitions as in the preceding sections, except that RadiusProximity, defined as follows, is substituted for DiameterProximity:

RadiusProximity(s, C)=proximity of s to the center of C where the center of C is defined as in the Cluster Center section, i.e. as the cluster member with least specificity.

The diameter method may be used for analytical applications, as in assessing the relative importance of issues reported in the conversational agent 104, whereas the radius method may be used when cluster attachment is used in the conversational agent 104 to identify the intent of a user utterance.

In an implementation, a hybrid approach is used by the conversational agent 104. In this approach, diameter proximity is used, except for clusters whose size exceeds a certain threshold, e.g., 500.

Applications

The above techniques may be leveraged in a variety of different applications. For example, the importance of an individual case of bad-quality response may be accessed. The ability to sort utterances by attachment frequency makes it possible to report an individual issue not as a request to remedy that particular issue; but as information on what topics may be improved; or to decide that improvement is not desirable should it be found that this particular utterance does not correspond to a (frequent) topic. This approach allows a prioritized approach to agent improvement.

In another example, corpora may be displayed by topic. While nontrivial clusters (i.e. clusters of more than 1 utterance) may account for a varying proportion of a given corpus, cluster attachment may make it possible to consider each single utterance in a corpus as a member of an enlarged cluster. This makes it possible to use summarization techniques that use the center of a cluster or the k most central utterances of an enlarged cluster to represent potentially hundreds or thousands of sentences, thus enabling efficient browsing of a corpus. Such efficient browsing may be further facilitated by sorting enlarged clusters by the sum of the attachment frequencies of their members, thus giving most prominence to the most popular topics.

In a further example, online exploitation of cluster attachment may be performed. Determining the attachment cluster of a single sentence may be performed with sufficient speed to be used as part of a conversational agent's matching process. In cases where a conversational agent 104 cannot determine a specific intent for a user input, identifying its topic through cluster attachment can enable the agent to:

1. answer based on knowledge of the topic;
2. make it clear to the user that topic determination is an inference the agent made and ask for confirmation before answering on this topic; or
3. tell an end user that the agent does not yet know how to handle the particular topic, and possibly present the user with a search query or search result as a palliative measure.

The choice between options 1 and 2 is a matter of level of confidence, which is determined by the attachment proximity of the utterance. In an implementation, a proximity value of 0.33 is used as a cut-off point between low confidence and high confidence.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computer processors configured to perform semantic clustering, the method comprising:
   computationally performing a linguistics analysis of a corpus of user utterances to identify semantic graphs that match respective user utterances in the corpus;
   computationally clustering the semantic graphs of the utterances in the corpus based on user intent to form one or more semantic clusters; and
   attaching additional semantic graphs of user utterances to the one or more semantic clusters based on the user intent.

2. The method as claimed in claim 1, wherein the corpus is a first corpus, and wherein the method further comprises:
   computationally processing through a linguistics analysis of a second corpus of user utterances to identify semantic graphs that match respective user utterances in the second corpus, wherein the additional attached semantic graphs of user utterances are from the second corpus.

3. The method as claimed in claim 2, wherein the one or more semantic clusters correspond to topics that occur in the first corpus but not in the second corpus.

4. The method as claimed in claim 3, wherein at least one of said topics is expressed by at least two semantic graphs formed by linguistic analysis and from first and second sets of semantic clusters using different words and grammatical structures.

5. The method as claimed in claim 2, wherein the first and second corpa correspond to different time intervals.

6. The method as claimed in claim 2, wherein user utterances from at least the first or second corpa are derived from a natural language dialog with an executing conversational agent.

7. The method as claimed in claim 6 wherein the executing conversational agent is configured to leverage the one or more semantic clusters in order to respond to interaction with the user.

8. The method as claimed in claim 2, wherein user utterances from at least the first or second corpa are derived from voice input provided by a client device.

9. The method as claimed in claim 2, wherein user utterances from at least one of the first or second corpora are derived from an instant messaging conversation, or a feed from a short messaging service (SMS), social networking, blogging, or micro-blogging service.

10. A computing device comprising:
    a processor;
    a computer storage operationally coupled to the processor and configured to store a corpus of user utterances received by a conversational agent, configured to be processed computationally by the processor, through an interactive natural language dialog with a user;
    the conversational agent further configured to perform computationally a linguistics analysis of the corpus of user utterances to identify semantic graphs that match respective user utterances in the corpus;
    the executing conversational agent still further configured to:
       cluster computationally the semantic graphs of the utterances in the first corpus based on user intent to form one or more semantic clusters; and
       attach additional semantic graphs of user utterances to the one or more semantic clusters based on the user intent.

11. The computing device as claimed in claim 10 wherein the corpus is a first corpus; and wherein the method further includes the conversational agent being further configured to:
    computationally process though a linguistics analysis of a second corpus of user utterances to identify semantic graphs that match respective user utterances in the second corpus, wherein the additional attached semantic graphs of user utterances are from the second corpus.

12. The computing device as claimed in claim 11, wherein the one or more semantic clusters correspond to topics that occur in the first corpus but not in the second corpus.

13. The computing device as claimed in claim 11, wherein at least one of said topics is expressed by at least two semantic graphs formed by linguistic analysis and from first and second sets of semantic clusters using different words and grammatical structures.

14. The computing device as claimed in claim 11, wherein the first and second corpa correspond to different time intervals.

15. The computing device as claimed in claim 11, wherein user utterances from at least the first or second corpa are derived from a natural language dialog with the executing conversational agent.

16. The computing device as claimed in claim 11, wherein user utterances from at least the first or second corpa are derived from voice input received via a mobile phone device.

17. The computing device as claimed in claim 11, wherein user utterances from at least one of the first or second corpora are derived from an instant messaging conversation, or a feed from a short messaging service (SMS), social networking, blogging, or micro-blogging service.

18. The computing device as claimed in claim 10 wherein the executing conversation agent is further configured to leverage the one or more semantic clusters in order to respond to interaction with the user.

19. A computer program product stored on a non-transitory computer useable medium having computer readable instructions, which, when executed by one or more computer processors, cause the one or more computer processors to execute a conversation agent configured to perform semantic clustering by:
    receiving a subject user utterance through a natural language dialog with the conversation agent;
    forming an intent graph pattern of that subject user utterance;
    comparing the intent graph pattern of the subject user utterance with one or more clusters of user utterances to identify a semantic graph of a user utterance in the cluster that matches the intent graph pattern of the subject user utterance;

responding to the subject user utterance based at least in part on the semantic graph in the cluster that matches the intent graph pattern of the subject user utterance; and attaching a semantic graph of the subject user utterance to the cluster based on the user intent.

20. The computer program product as claimed in claim 19, wherein the subject user utterance is part of a corpus of a plurality of user utterances, which are derived from a natural language dialog with the conversation agent.

* * * * *